United States Patent
Shinoda

(10) Patent No.: US 10,107,163 B2
(45) Date of Patent: Oct. 23, 2018

(54) EXHAUST GAS PURIFICATION APPARATUS FOR AN INTERNAL COMBUSTION ENGINE

(71) Applicant: TOYOTA JIDOSHA KABUSHIKI KAISHA, Toyota-shi, Aichi-ken (JP)

(72) Inventor: Yoshihisa Shinoda, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 116 days.

(21) Appl. No.: 15/231,849

(22) Filed: Aug. 9, 2016

(65) Prior Publication Data

US 2017/0044953 A1 Feb. 16, 2017

(30) Foreign Application Priority Data

Aug. 10, 2015 (JP) ................. 2015-158104

(51) Int. Cl.
*F01N 3/20* (2006.01)
*F01N 3/10* (2006.01)
(Continued)

(52) U.S. Cl.
CPC ....... *F01N 3/2073* (2013.01); *B01D 53/9418* (2013.01); *B01D 53/9495* (2013.01); *F01N 3/0814* (2013.01); *F01N 3/101* (2013.01); *F01N 3/105* (2013.01); *F01N 9/00* (2013.01); *F02D 41/025* (2013.01); *F02D 41/0275* (2013.01);
(Continued)

(58) Field of Classification Search
CPC ............ B01D 53/9418; B01D 53/9495; F01N 3/0814; F01N 3/101; F01N 3/105; F01N 3/2073; F01N 9/00; F01N 2250/12; F01N 2430/06; F01N 2900/1616; F02D 41/025; F02D 41/0275; F02D 2041/1468; F02D 2041/1469
See application file for complete search history.

(56) References Cited

U.S. PATENT DOCUMENTS

| 8,392,091 B2 * | 3/2013 | Hebbale | F01N 9/00 701/102 |
| 9,291,526 B2 * | 3/2016 | Fosaaen | F02D 41/1446 |

(Continued)

FOREIGN PATENT DOCUMENTS

| JP | 2008-223611 A | 9/2008 |
| JP | 2008-286102 A | 11/2008 |

(Continued)

*Primary Examiner* — Laert Dounis
*Assistant Examiner* — Matthew T Largi
(74) *Attorney, Agent, or Firm* — Hunton Andrews Kurth LLP

(57) ABSTRACT

An amount of ammonia flowing out from an SCR catalyst is reduced at the time of carrying out rich spike control to reduce an amount of NOx stored in an NSR catalyst. The NSR catalyst and the SCR catalyst are arranged in order in an exhaust passage of an internal combustion engine which is able to be operated at a lean air fuel ratio, wherein a target air fuel ratio of exhaust gas flowing into the NSR catalyst during the rich spike control is made higher within the range of a rich air fuel ratio, in the case where the outflow of ammonia from the SCR catalyst in accompany with the rich spike control is estimated or detected, than in the case where it is not estimated or detected.

7 Claims, 5 Drawing Sheets

(51) Int. Cl.
  *F01N 3/08* (2006.01)
  *B01D 53/94* (2006.01)
  *F02D 41/02* (2006.01)
  *F01N 9/00* (2006.01)
  *F02D 41/14* (2006.01)

(52) U.S. Cl.
  CPC ...... *F01N 2250/12* (2013.01); *F01N 2430/06* (2013.01); *F01N 2900/1616* (2013.01); *F02D 2041/1468* (2013.01); *F02D 2041/1469* (2013.01); *Y02T 10/22* (2013.01); *Y02T 10/24* (2013.01); *Y02T 10/26* (2013.01); *Y02T 10/47* (2013.01)

(56) References Cited

U.S. PATENT DOCUMENTS

| | | | |
|---|---|---|---|
| 2005/0129601 A1* | 6/2005 | Li | B01D 53/9418 423/239.2 |
| 2010/0005873 A1 | 1/2010 | Katoh et al. | |
| 2010/0071347 A1* | 3/2010 | Yoshida | B01D 53/9418 60/276 |
| 2010/0107605 A1* | 5/2010 | Brinkman | B01D 53/9418 60/274 |
| 2010/0115926 A1* | 5/2010 | Nagaoka | B01D 53/9459 60/286 |
| 2010/0132335 A1* | 6/2010 | Theis | F01N 3/0814 60/286 |
| 2011/0138783 A1* | 6/2011 | Sakurai | B01D 53/9477 60/276 |
| 2015/0322839 A1 | 11/2015 | Oda et al. | |
| 2016/0326933 A1 | 11/2016 | Shinoda | |

FOREIGN PATENT DOCUMENTS

| | | | | |
|---|---|---|---|---|
| JP | 2009-097469 A | 5/2009 | | |
| JP | WO 2014115303 A1 * | 7/2014 | ........... | F01N 3/0814 |
| JP | 2015-135077 A | 7/2015 | | |
| WO | 2011-042956 A1 | 4/2011 | | |
| WO | 2014-115303 A1 | 7/2014 | | |

* cited by examiner

[Fig. 1]
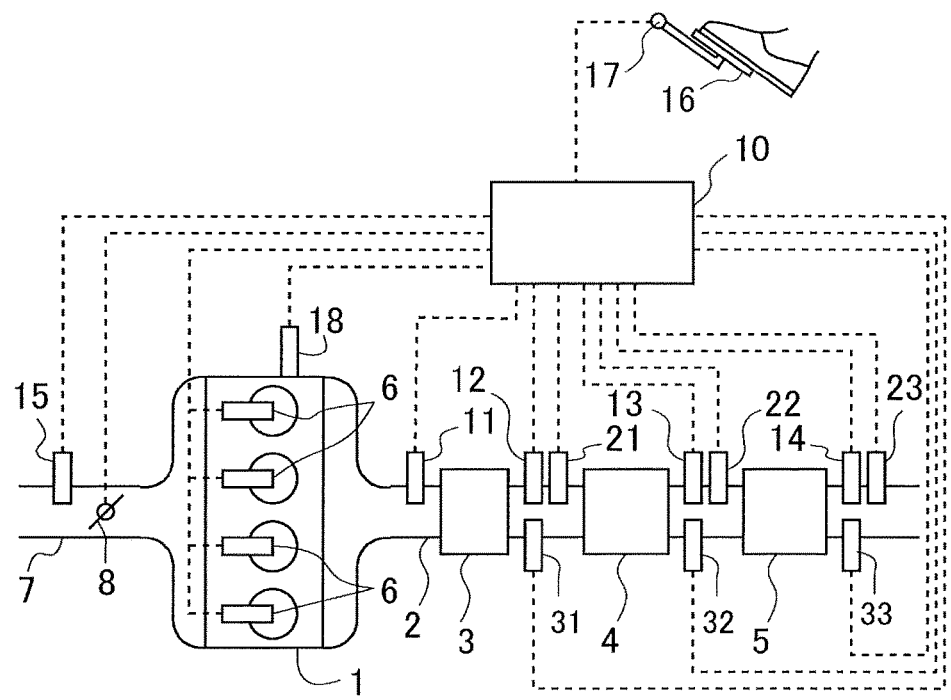

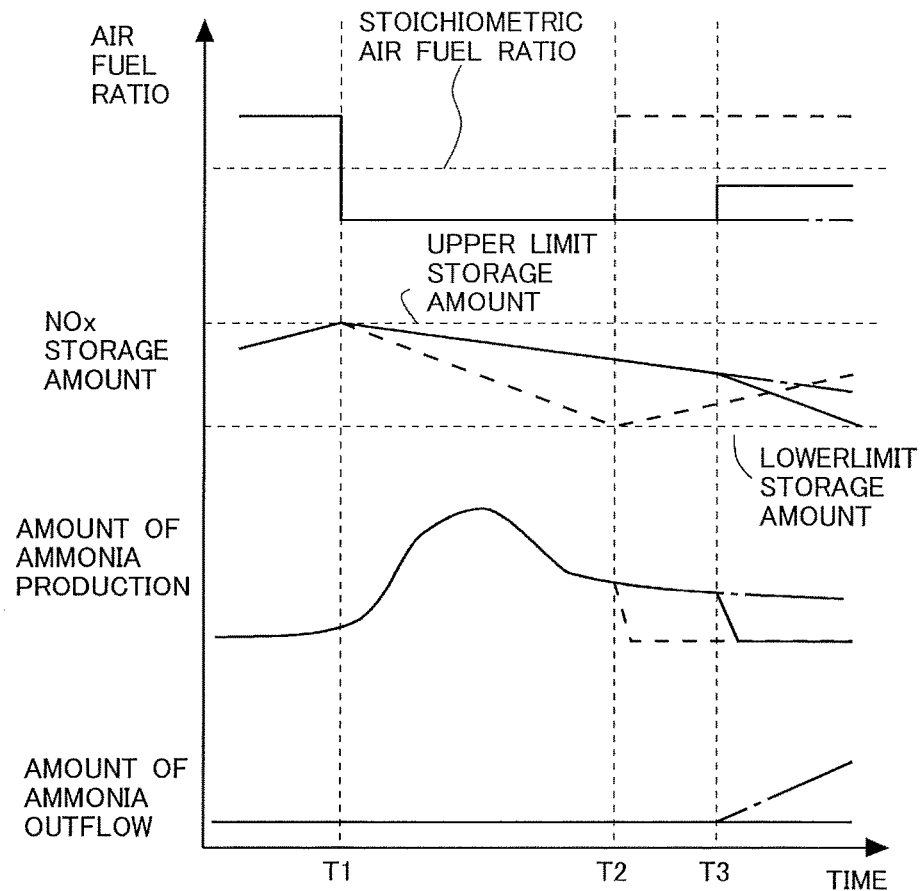

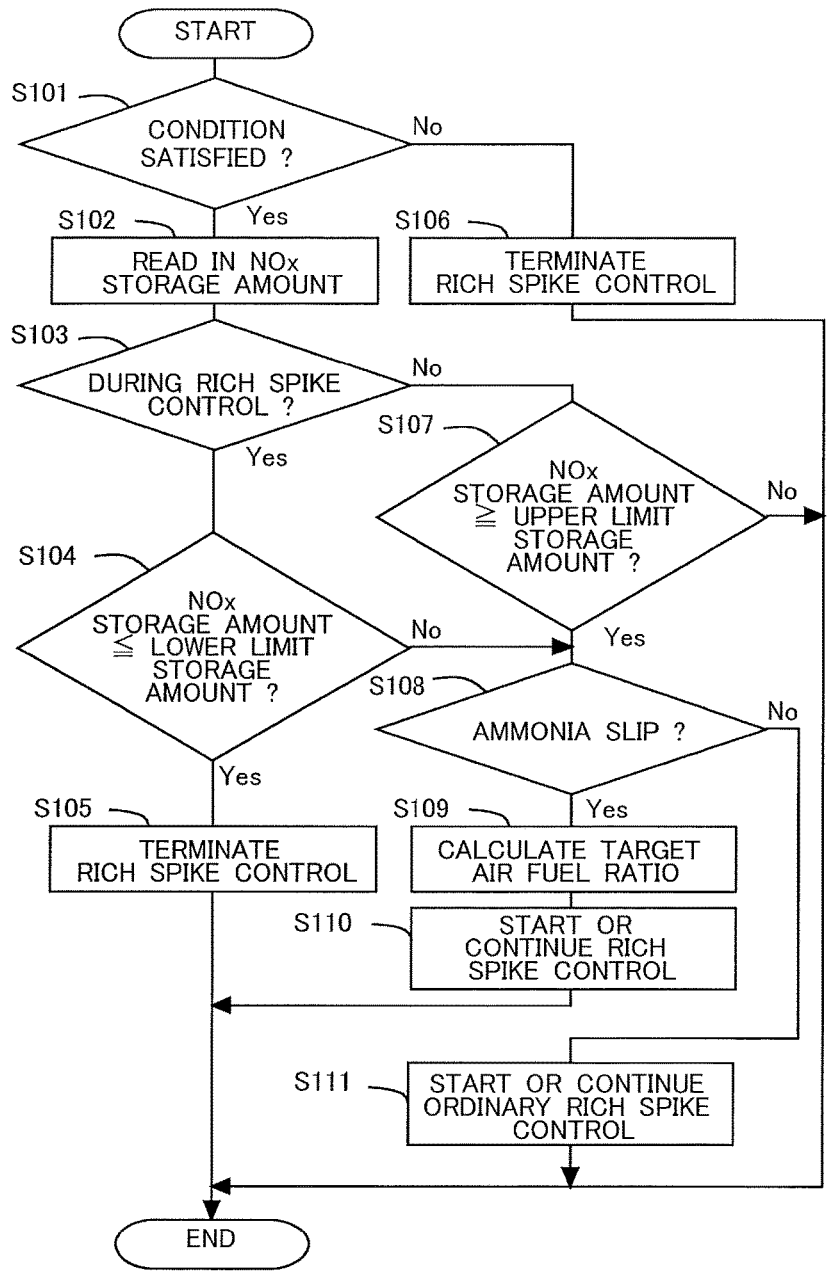

[Fig. 4]
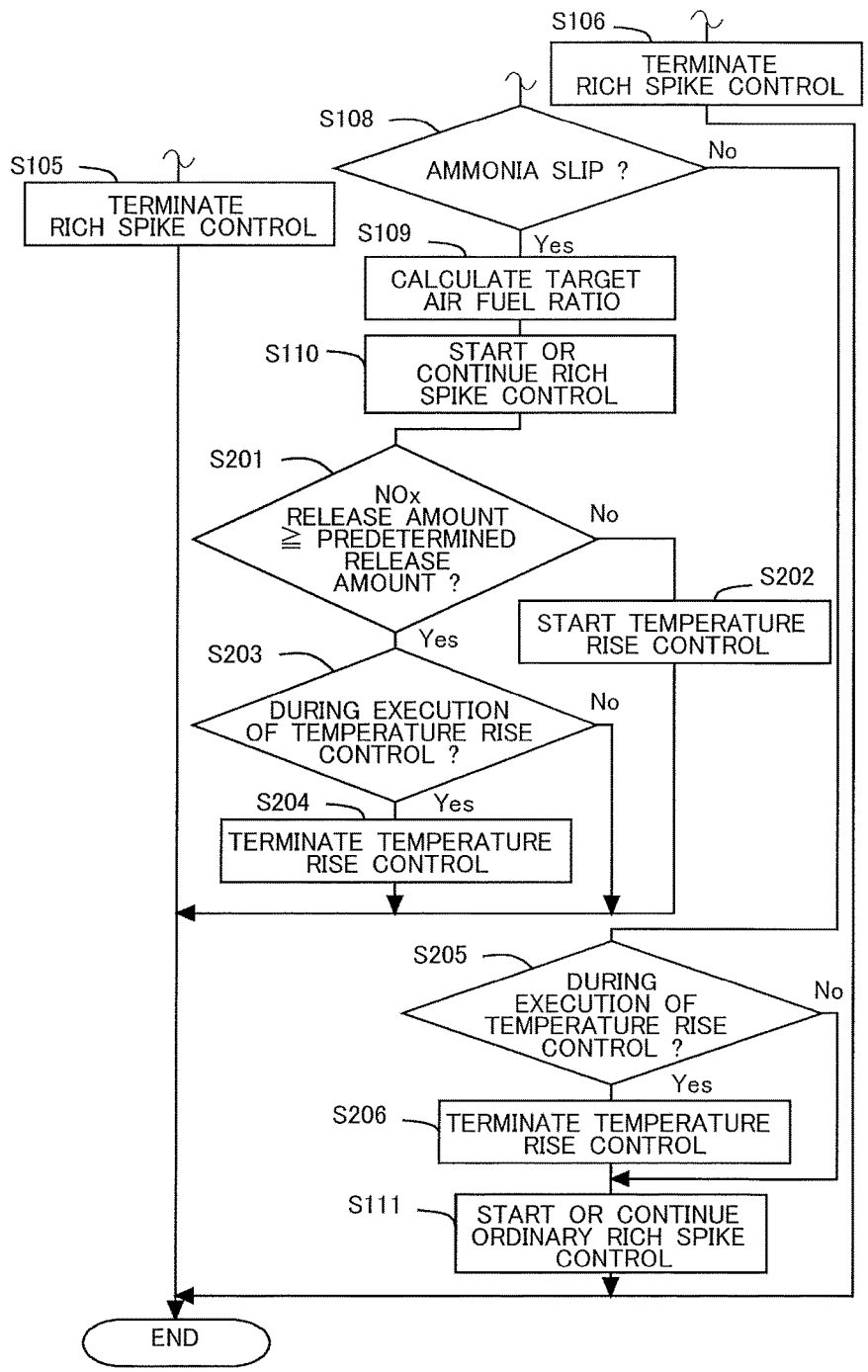

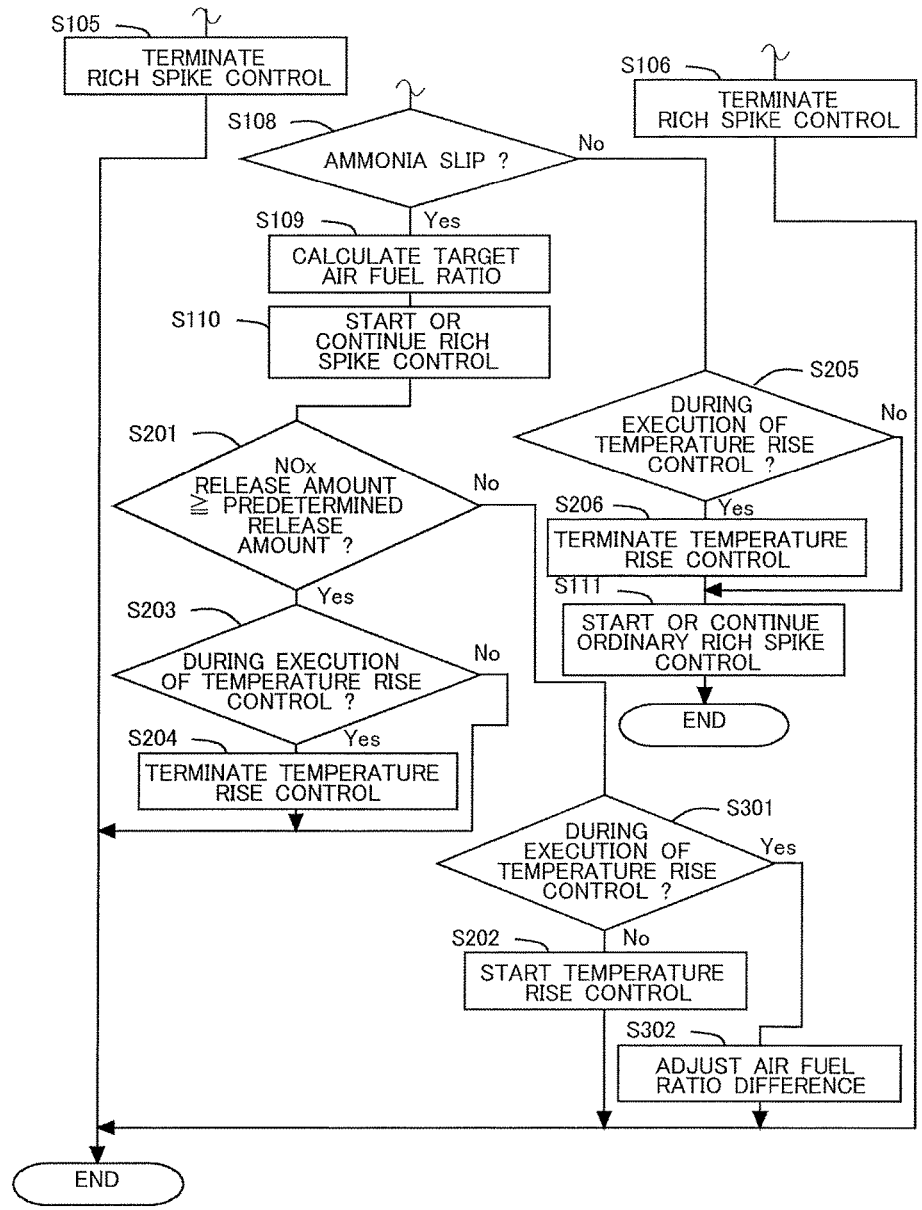

EXHAUST GAS PURIFICATION APPARATUS FOR AN INTERNAL COMBUSTION ENGINE

CROSS REFERENCE TO RELATED APPLICATIONS

This application claims priority to Japanese Patent Application No. 2015-158104 filed on Aug. 10, 2015, the entire contents of which are incorporated by reference herein.

BACKGROUND OF THE INVENTION

Field of the Invention

The present invention relates to an exhaust gas purification apparatus for an internal combustion engine.

Description of the Related Art

It is known that in an exhaust passage of an internal combustion engine which is able to be operated by an air fuel mixture of a lean air fuel ratio, there are arranged a three-way catalyst, an NOx storage reduction catalyst (hereinafter referred to as an NSR catalyst) and an NOx selective catalytic reduction catalyst (hereinafter also referred to as an SCR catalyst) sequentially in this order from an upstream side. The NSR catalyst serves to occlude or store NOx contained in an incoming exhaust gas when the oxygen concentration of the incoming exhaust gas is high, and to reduce the occluded or stored NOx when the oxygen concentration of the incoming exhaust gas becomes low and when a reducing agent exists. Because there is a limit in the amount of NOx able to be stored in the NSR catalyst, when a certain amount of NOx is stored in the NSR catalyst, rich spike control is carried out in order to recover the NOx storage ability of the NSR catalyst. The rich spike control is processing to temporarily control the air fuel ratio of the exhaust gas to a rich air fuel ratio. By carrying out this rich spike control, NOx is released from the NSR catalyst, and the NOx thus released is reduced by a reducing agent such as HC, so that the storage amount of NOx in the NSR catalyst is decreased.

On the other hand, the SCR catalyst serves to selectively reduce NOx in the exhaust gas by using ammonia as a reducing agent. Then, ammonia is produced by the reaction of HC or $H_2$ in the exhaust gas with NOx in the three-way catalyst or the NSR catalyst. This ammonia can be used as the reducing agent in the SCR catalyst. In the above-mentioned catalyst arrangement, when the rich spike control is carried out, ammonia may be produced in the three-way catalyst or the NSR catalyst.

Here, there is also known a technology in which a target value of ammonia to be adsorbed by the SCR catalyst is calculated, and only in cases where an integrated value of the amounts of ammonia produced in the three-way catalyst and the NSR catalyst is less than the target value, ammonia is produced (for example, refer to a first patent literature).

CITATION LIST

Patent Literature

First Patent Literature: Japanese patent laid-open publication No. 2008-286102

SUMMARY OF THE INVENTION

Technical Problem

For example, in cases where the temperature of exhaust gas is low or in cases where the flow rate of exhaust gas is small, at the time of idle operation, etc., the temperature of the NSR catalyst becomes low, and the NOx reduction ability of the NSR catalyst decreases. Accordingly, even if the rich spike control is carried out in order to reduce the NOx stored in the NSR catalyst, a certain period of time is required until the reduction of NOx is completed. Then, when the rich spike control is carried out in order to reduce the NOx stored in the NSR catalyst, ammonia may be produced in the three-way catalyst and the NSR catalyst under a predetermined reducing atmosphere. The ammonia produced in the NSR catalyst is adsorbed to the SCR catalyst. In cases where the activity of the NSR catalyst is low, the ammonia produced in the three-way catalyst also passes through the NSR catalyst, and is adsorbed to the SCR catalyst. For this reason, even if the rich spike control is carried out in order to reduce the NOx stored in the NSR catalyst, but when a period of time to carry out the rich spike control becomes long, ammonia will consequently continue to be supplied to the SCR catalyst. In that case, depending on the amount of adsorption of ammonia in the SCR catalyst at the time of the start of the rich spike control, and the amount of ammonia to be supplied to the SCR catalyst during the rich spike control, it becomes impossible for the SCR catalyst to be able to adsorb ammonia, thus giving rise to a fear that ammonia may flow out from the SCR catalyst.

The present invention has been made in view of the problem as mentioned above, and the object of the invention is to reduce an amount of ammonia flowing out from an SCR catalyst at the time of carrying out rich spike control to decrease an amount of NOx stored in an NSR catalyst.

Solution to Problem

In order to solve the above-mentioned problem, according to the present invention, there is provided an exhaust gas purification apparatus for an internal combustion engine which is able to be operated at a lean air fuel ratio, said apparatus comprising: an NOx storage reduction catalyst that is arranged in an exhaust passage of said internal combustion engine, and serves to store NOx when an air fuel ratio of exhaust gas is a lean air fuel ratio, and to reduce the NOx thus stored when the air fuel ratio of the exhaust gas is equal to or less than a stoichiometric air fuel ratio, wherein ammonia is produced in a reducing atmosphere in which a predetermined amount of a reducing agent exists; an NOx selective catalytic reduction catalyst that is arranged in said exhaust passage at a location downstream of said NOx storage reduction catalyst, and serves to adsorb ammonia and to reduce the NOx by using the ammonia thus adsorbed as a reducing agent; an ammonia outflow detector configured to estimate or detect an outflow of ammonia from said NOx selective catalytic reduction catalyst; and a controller comprising at least one processor configured to carry out rich spike control in which an air fuel ratio of exhaust gas flowing into said NOx storage reduction catalyst is controlled to a rich air fuel ratio; wherein said controller farther configured to carry out air fuel ratio raising control in which a target air fuel ratio of the exhaust gas flowing into said NOx storage reduction catalyst during said rich spike control is made higher within the range of the rich air fuel ratio, in the case where the outflow of ammonia from said NOx selective catalytic reduction catalyst in accompany with the rich spike control is estimated or detected by said ammonia outflow detector, than in the case where it is not estimated or detected.

The controller may carry out the air fuel ratio raising control thereby to make the air fuel ratio high, in cases where the outflow of ammonia from the SCR catalyst has been estimated or detected at the time of carrying out the rich spike control, or even in cases where it is estimated before starting the rich spike control that in the case where the rich spike control is started, ammonia will flow out from the SCR catalyst. In the case where the outflow of ammonia from the SCR catalyst is estimated from before starting the rich spike control, the air fuel ratio raising control is carried out from the start of the rich spike control. Even if the air fuel ratio is made high by means of the air fuel ratio raising control, but when it is within the range of the rich air fuel ratio, NOx will be released from the NSR catalyst. Accordingly, even if the air fuel ratio raising control is carried out, the storage amount of NOx in the NSR catalyst can be decreased. In addition, under the environment in which oxygen is smaller than at the time of the lean air fuel ratio and the reducing agent is also smaller than at the time of the rich spike control for the reduction of the NOx stored in the NSR catalyst, a phenomenon has been found that a larger amount of NOx stored in the NSR catalyst is released. By utilizing this phenomenon, the release of NOx from the NSR catalyst can be promoted. That is, by carrying out the air fuel ratio raising control, the NSR catalyst can be placed under the environment in which oxygen and the reducing agent are small, so that the release of NOx from the NSR catalyst is promoted. Accordingly, the release speed or rate of NOx from the NSR catalyst becomes high, so the storage amount of NOx in the NSR catalyst can be decreased more quickly. Moreover, when the air fuel ratio raising control is carried out, the amount of reducing agent in the exhaust gas is decreased more than at the time of the rich spike control for the reduction of the NOx stored in the NSR catalyst, so that the reducing agent runs short in the NSR catalyst. Accordingly, the NOx released from the NSR catalyst arrives at the SCR catalyst, without being reduced. On the other hand, the air fuel ratio raising control is carried out in the case where the outflow of ammonia from the SCR catalyst is estimated or detected, and hence, when the air fuel ratio raising control is carried out, there is a high probability that ammonia has already been adsorbed in the SCR catalyst. For this reason, the NOx released from the NSR catalyst becomes able to be reduced by the ammonia in the SCR catalyst. With this, the amount of adsorption of ammonia in the SCR catalyst can be decreased, thus making it possible to suppress the ammonia from flowing out from the SCR catalyst. Further, when the air fuel ratio raising control is carried out, the ammonia produced in the NSR catalyst is decreased so that the supply of ammonia to the SCR catalyst can be suppressed, thereby making it possible to suppress ammonia from flowing out from the SCR catalyst, too. That is, according to the air fuel ratio raising control, the decrease in the amount of supply of ammonia to the SCR catalyst, and the increase in the amount of ammonia consumption in the SCR catalyst can be made compatible with each other. In this manner, it is possible to decrease the storage amount of NOx in the NSR catalyst, and to suppress ammonia from flowing out from the SCR catalyst.

In addition, said controller can estimate a storage amount of NOx in said NOx storage reduction catalyst, and said controller can make said target air fuel ratio in said air fuel ratio raising control higher when the storage amount of NOx in said NOx storage reduction catalyst estimated by said controller is large, than when it is small.

The larger the storage amount of NOx in the NSR catalyst, the larger the amount of production of ammonia at the time of the air fuel ratio raising control may become. Accordingly, by making the target air fuel ratio higher in the range of the rich air fuel ratio according to the storage amount of NOx in the NSR catalyst, the amount of ammonia to be produced can be decreased, thus making it possible to suppress the ammonia from flowing out from the SCR catalyst. Moreover, when the target air fuel ratio is made high in the range of the rich air fuel ratio, the release of NOx from the NSR catalyst can be promoted, so that the storage amount of NOx in the NSR catalyst can be decreased. On the other hand, in the case where the storage amount of NOx is small, the target air fuel ratio becomes close to an air fuel ratio suitable for reducing NOx, so that the NOx stored in the NSR catalyst can be reduced quickly.

Moreover, provision can further be made for an inflow ammonia amount estimator configured to estimate or detect an amount of ammonia flowing into said NOx selective catalytic reduction catalyst, wherein said controller can make said target air fuel ratio in said air fuel ratio raising control higher when the amount of ammonia estimated or detected by said inflow ammonia amount estimator is large, than when it is small.

The larger the amount of ammonia flowing into the SCR catalyst at the time of the air fuel ratio raising control, the easier it becomes for ammonia to flow out from the SCR catalyst. Accordingly, by making the target air fuel ratio higher in the range of the rich air fuel ratio according to the amount of ammonia flowing into the SCR catalyst, the amount of ammonia to be produced in the NSR catalyst can be decreased. For this reason, the amount of ammonia flowing into the SCR catalyst can be decreased, thus making it possible to suppress the ammonia from flowing out from the SCR catalyst. Moreover, when the target air fuel ratio is made high in the range of the rich air fuel ratio by means of the air fuel ratio raising control, the release of NOx from the NSR catalyst can be promoted, so that the storage amount of NOx in the NSR catalyst can be decreased.

In addition, provision can further be made for: a release amount detector configured to estimate or detect an amount of NOx released per unit time from said NOx storage reduction catalyst; and a three-way catalyst that is arranged in the exhaust passage at a location upstream of said NOx storage reduction catalyst; wherein said internal combustion engine can be provided with one or a plurality of cylinders; in cases where the amount of NOx released per unit time from said NOx storage reduction catalyst estimated or detected by said release amount detector in a state where said target air fuel ratio is made high in the range of the rich air fuel ratio by means of said air fuel ratio raising control becomes less than a predetermined release amount, said controller can carry out temperature rise control in which an air fuel ratio of the internal combustion engine is changed so that oxygen and unburnt fuel are contained in the exhaust gas flowing into said three-way catalyst, while controlling the air fuel ratio of the exhaust gas flowing into said NOx storage reduction catalyst to the same air fuel ratio as said target air fuel ratio in said air fuel ratio raising control; and said controller can carry out said temperature rise control by changing air fuel ratios of all cylinders of said internal combustion engine between the rich air fuel ratio and the lean air fuel ratio in an alternate manner.

In this manner, by alternately changing the air fuel ratios of all the cylinders of said internal combustion engine between the rich air fuel ratio and the lean air fuel ratio by means of said temperature rise control, it is possible to discharge an exhaust gas of the rich air fuel ratio and an exhaust gas of the lean air fuel ratio from the internal combustion engine in an alternate manner. With this, unburnt fuel can be oxidized in the three-way catalyst, and the temperature of the exhaust gas flowing into the NSR catalyst can be raised, so that the temperature of the NSR catalyst can be raised. At this time, the air fuel ratio in the internal combustion engine is controlled in such a manner that the air fuel ratio of the exhaust gas flowing into the NSR catalyst becomes the same air fuel ratio as the target air fuel ratio at the time of the air fuel ratio raising control. Here, in the temperature rise control, when the mixtures in all the cylinders are each combusted at the rich air fuel ratio, a relatively large amount of unburnt fuel is discharged, whereas when the mixtures in all the cylinders are each combusted at the lean air fuel ratio, a relatively large amount of oxygen is discharged. Then, when the unburnt fuel is oxidized by oxygen in the three-way catalyst, reaction heat will be generated, so that the temperature of the NSR catalyst at the downstream side of the three-way catalyst goes up. As a result of this, the activity of the NSR catalyst can be promoted, and so the release of NOx from the NSR catalyst can be promoted. The air fuel ratio in the internal combustion engine is controlled in such a manner that oxygen and unburnt fuel are made to discharge from the internal combustion engine so as to react with each other in the three-way catalyst, and the air fuel ratio of exhaust gas containing the oxygen and unburnt fuel thus discharged at the time of flowing out from the three-way catalyst becomes the same air fuel ratio as the target air fuel ratio at the time of the air fuel ratio raising control. That is, in the three-way catalyst, the air fuel ratio of the exhaust gas is averaged, and the air fuel ratio in the internal combustion engine is controlled in such a manner that the air fuel ratio of the exhaust gas flowing out from the three-way catalyst becomes the same air fuel ratio as the target air fuel ratio at the time of the air fuel ratio raising control. In this manner, at the time of the temperature rise control, too, the exhaust gas of the same air fuel ratio as the target air fuel ratio at the time of the air fuel ratio raising control can be supplied to the NSR catalyst. As a result of this, the release of NOx from the NSR catalyst can be promoted.

Moreover, provision can further be made for: a release amount detector configured to estimate or detect an amount of NOx released per unit time from said NOx storage reduction catalyst; and a three-way catalyst that is arranged in the exhaust passage at a location upstream of said NOx storage reduction catalyst; wherein said internal combustion engine can be provided with a plurality of cylinders; and in cases where the amount of NOx released per unit time from said NOx storage reduction catalyst estimated or detected by said release amount detector in a state where said target air fuel ratio is made high in the range of the rich air fuel ratio by means of said air fuel ratio raising control becomes less than a predetermined release amount, said controller can carry out temperature rise control in which an air fuel ratio of the internal combustion engine is changed so that oxygen and unburnt fuel are contained in the exhaust gas flowing into said three-way catalyst, while controlling the air fuel ratio of the exhaust gas flowing into said NOx storage reduction catalyst to the same air fuel ratio as said target air fuel ratio in said air fuel ratio raising control; and said controller can carry out said temperature rise control by controlling a part of cylinders of said internal combustion engine to the lean air fuel ratio and controlling at least a part of the remaining cylinders to the rich air fuel ratio.

In cases where the internal combustion engine is provided with a plurality of cylinders, the air fuel ratio can also be changed for each of the cylinders. In the temperature rise control, by discharging a relatively large amount of oxygen by means of controlling the air fuel ratio in a part of the cylinders to the lean air fuel ratio, and by discharging a relatively large amount of unburnt fuel by means of controlling the air fuel ratio of the remaining cylinder(s) to the rich air fuel ratio, unburnt fuel can be oxidized in the three-way catalyst, and the temperature of the NSR catalyst can be raised. At this time, when the air fuel ratio for each cylinder is set in such a manner that the air fuel ratio of the exhaust gas flowing out from the three-way catalyst becomes the same air fuel ratio as the target air fuel ratio at the time of the air fuel ratio raising control, NOx will be released from the NSR catalyst.

Further, in the case of carrying out said temperature rise control, said controller may make, in said temperature rise control, the air fuel ratio of a cylinder of the lean air fuel ratio to be higher and the air fuel ratio of a cylinder of the rich air fuel ratio to be lower, in the case where the amount of NOx released per unit time from said NOx storage reduction catalyst estimated or detected by said release amount detector is small than in the case where it is large, while controlling the air fuel ratio of the exhaust gas flowing into said NOx storage reduction catalyst to the same air fuel ratio as said target air fuel ratio in said air fuel ratio raising control.

According to this, as the amount of NOx released per unit time becomes smaller, larger amounts of oxygen and unburnt fuel will be supplied to the three-way catalyst at the time of the temperature rise control, thus producing a large amount of heat in the three-way catalyst. Due to this heat, the temperature of the NSR catalyst is made higher, so that the release of NOx from the NSR catalyst can be promoted.

In addition, said ammonia outflow detector can estimate, before starting said rich spike control, whether in the case of assuming that said rich spike control is carried out, ammonia will flow out from said NOx selective catalytic reduction catalyst due to said rich spike control, and said controller can carry out said air fuel ratio raising control from the time of starting said rich spike control, in cases where it is estimated, before starting said rich spike control, by said ammonia outflow detector that ammonia will flow out.

That is, in cases where the outflow of ammonia from the SCR catalyst is expected beforehand, it is possible to suppress ammonia from flowing out from the SCR catalyst in the early stage of the rich spike control, by carrying out the air fuel ratio raising control from the beginning of the rich spike control, instead of switching or changing the target air fuel ratio during the course of the rich spike control, using, as a starting point, the time at which ammonia actually flows out from the SCR catalyst.

Moreover, said ammonia outflow detector can be an NOx sensor that is arranged in the exhaust passage at a location downstream of said NOx selective catalytic reduction catalyst, for detecting an NOx concentration and an ammonia concentration in the exhaust gas, and said controller can carry out said air fuel ratio raising control, in cases where ammonia is detected by said NOx sensor in the course of carrying out said rich spike control.

In cases where ammonia is detected by the NOx sensor, it is considered that ammonia can not be fully adsorbed by the SCR catalyst. Accordingly, by carrying out the air fuel ratio raising control at this time, the amount of ammonia consumed in the SCR catalyst is increased, while decreasing the amount of ammonia to be supplied to the SCR catalyst, so that ammonia can be suppressed from flowing out from the SCR catalyst.

In at least one of the case where the temperature of said NOx storage reduction catalyst is less than a predetermined temperature, and the case where the flow rate of the exhaust gas is less than a predetermined flow rate, and at the same time, in the case where the amount of ammonia adsorbed in said NOx selective reduction catalyst is equal to or more than a predetermined amount of adsorption, said ammonia outflow detector can estimate that ammonia will flow out from said NOx selective catalytic reduction catalyst when said rich spike control is carried out.

In cases where the temperature of the NSR catalyst is low, or in cases where the flow rate of the exhaust gas is small, the activity of the NSR catalyst becomes low, and the amount of NOx released per unit time in the NSR catalyst becomes small, so that a period of time to carry out the rich spike control becomes long. For this reason, in cases where the amount of adsorption of ammonia in the SCR catalyst is equal to or more than the predetermined amount of adsorption, the ammonia produced in the NSR catalyst at the time of rich spike control will not be able to be fully adsorbed to the SCR catalyst, and hence, there will be a high possibility that ammonia flows out from the SCR catalyst. Accordingly, by setting, as the predetermined temperature, a temperature of the NSR catalyst which becomes a lower limit of a temperature range in which ammonia does not flow out from the SCR catalyst, and by setting, as the predetermined flow rate, a flow rate of the exhaust gas which becomes a lower limit of a flow rate range in which ammonia does not flow out from the SCR catalyst, and by setting, as the predetermined amount of adsorption, an amount of adsorption of ammonia in which ammonia flows out from the SCR catalyst in at least one of the case where the temperature of the NSR catalyst is less than the predetermined temperature, and the case where the flow rate of the exhaust gas is less than the predetermined flow rate, it can be estimated based on these values whether ammonia flows out from the SCR catalyst. In this case, such an estimation can be made before starting the rich spike control, not to mention during the execution of the rich spike control.

Advantageous Effects of Invention

According to the present invention, it is possible to reduce the amount of ammonia flowing out from the SCR catalyst at the time of carrying out the rich spike control to decrease the amount of NOx stored in the NSR catalyst.

BRIEF DESCRIPTION OF DRAWINGS

FIG. 1 is a view showing the schematic construction of an internal combustion engine as well as its intake and exhaust systems according to embodiments of the present invention.

FIG. 2 is a time chart showing the changes over time of an air fuel ratio of exhaust gas, an amount of NOx stored in an NSR catalyst, an amount of ammonia produced by a three-way catalyst and the NSR catalyst, and an amount of ammonia flowing out from an SCR catalyst, when rich spike control is carried out.

FIG. 3 is a flow chart showing a flow for rich spike control for reducing NOx stored in the NSR catalyst according to a first embodiment of the present invention.

FIG. 4 is a flow chart showing a flow for rich spike control for reducing NOx stored in the NSR catalyst according to a second embodiment of the present invention.

FIG. 5 is a flow chart showing a flow for rich spike control for reducing NOx stored in the NSR catalyst according to a third embodiment of the present invention.

DESCRIPTION OF EMBODIMENTS

Hereinafter, the best modes for carrying out the present invention will be exemplarily described in detail based on preferred embodiments with reference to the attached drawings. However, the dimensions, materials, shapes, relative arrangements and so on of component parts described in the embodiments are not intended to limit the scope of the present invention to these alone in particular as long as there are no specific statements.

First Embodiment

FIG. 1 is a view showing the schematic construction of an internal combustion engine as well as its intake and exhaust systems according to a first and other embodiments of the present invention. An internal combustion engine 1 shown in FIG. 1 is a gasoline engine having four cylinders, but it may be a diesel engine. The internal combustion engine 1 is installed on a vehicle, for example.

An exhaust passage 2 is connected to the internal combustion engine 1. In the middle of the exhaust passage 2, a three-way catalyst 3, an NOx storage reduction catalyst 4 (hereinafter referred to as an NSR catalyst 4) and an NOx selective reduction catalyst 5 (hereinafter referred to as an SCR catalyst 5) are sequentially provided in this order from an upstream side.

The three-way catalyst 3 serves to purify or remove NOx, HC and CO at the time when a catalytic atmosphere therein is at a stoichiometric air fuel ratio. In addition, the three-way catalyst 3 has oxygen storage ability. That is, when the air fuel ratio of exhaust gas flowing into the three-way catalyst 3 is a lean air fuel ratio, an excess amount of oxygen is stored in the three-way catalyst 3, whereas when the air fuel ratio of the exhaust gas flowing into the three-way catalyst 3 is a rich air fuel ratio, a shortage of oxygen is released from the three-way catalyst 3, so that the catalytic atmosphere therein is thereby maintained at the stoichiometric air fuel ratio. By the action of such an oxygen storage ability, the three-way catalyst 3 can remove or reduce HC, CO and NOx, even if the air fuel ratio of the exhaust gas flowing into the three-way catalyst 3 is other than the stoichiometric air fuel ratio.

The NSR catalyst 4 serves to store NOx contained in the exhaust gas when the oxygen concentration of the incoming exhaust gas is high, and to reduce the stored NOx when the oxygen concentration of the incoming exhaust gas becomes low and when a reducing agent exists. For the reducing agent to be supplied to the NSR catalyst 4, there can be used HC or CO which is the unburnt fuel discharged from the internal combustion engine 1. In addition, the NSR catalyst 4 also has oxygen storage ability.

Here, in the three-way catalyst 3, the NOx in the exhaust gas may react with HC or $H_2$ to produce ammonia ($NH_3$). In addition, in the NSR catalyst 4, the NOx stored in the NSR catalyst 4 reacts with the HC or $H_2$ in the exhaust gas under a predetermined reducing atmosphere in which HC and CO exist, so that $NH_3$ may be produced. For example, if $H_2$ is generated from CO and $H_2O$ produced due to the combustion of fuel by means of a water gas shift reaction or steam reforming reaction, the $H_2$ reacts with NO thereby to produce $NH_3$ in the three-way catalyst 3 or the NSR catalyst 4. That is, ammonia is produced in the reducing atmosphere in which a predetermined amount of reducing agent exists. This predetermined amount is an amount of reducing agent in which ammonia is produced in the NSR catalyst 4, and has a certain amount of margin or variation.

The SCR catalyst 5 has adsorbed or stored the reducing agent, and carries out selective reduction of NOx by means of the reducing agent thus adsorbed or stored. For the reducing agent to be supplied to the SCR catalyst 5, there can be used the ammonia produced in the three-way catalyst 3 or the NSR catalyst 4.

In addition, a first air fuel ratio sensor 11 for measuring the air fuel ratio of the exhaust gas is mounted on the exhaust passage 2 at a location upstream of the three-way catalyst 3. Moreover, a second air fuel ratio sensor 12 for detecting the air fuel ratio of the exhaust gas, a first NOx sensor 21 for detecting the concentration of NOx in the exhaust gas and a first temperature sensor 31 for detecting the temperature of the exhaust gas are mounted on the exhaust passage 2 at locations downstream of the three-way catalyst 3 and upstream of the NSR catalyst 4. The air fuel ratio of the exhaust gas in the internal combustion engine 1 or the air fuel ratio of the exhaust gas flowing into the three-way catalyst 3 can be detected by the first air fuel ratio sensor 11. On the other hand, the air fuel ratio of the exhaust gas flowing out from the three-way catalyst 3 or the air fuel ratio of the exhaust gas flowing into the NSR catalyst 4 can be detected by the second air fuel ratio sensor 12. Further, the concentration of NOx in the exhaust gas flowing out from the three-way catalyst 3 or the concentration of NOx in the exhaust gas flowing into the NSR catalyst 4 can be detected by the first NOx sensor 21. In addition, the temperature of the three-way catalyst 3 can be detected by the first temperature sensor 31.

A third air fuel ratio sensor 13 for detecting the air fuel ratio of the exhaust gas, a second NOx sensor 22 for detecting the concentration of NOx in the exhaust gas and a second temperature sensor 32 for detecting the temperature of the exhaust gas are mounted on the exhaust passage 2 at locations downstream of the NSR catalyst 4 and upstream of the SCR catalyst 5. The air fuel ratio of the exhaust gas flowing out from the NSR catalyst 4 or the air fuel ratio of the exhaust gas flowing into the SCR catalyst 5 can be detected by the third air fuel ratio sensor 13. On the other hand, the concentration of NOx in the exhaust gas flowing out from the NSR catalyst 4 or the concentration of NOx in the exhaust gas flowing into the SCR catalyst 5 can be detected by the second NOx sensor 22. Further, the temperature of the NSR catalyst 4 can be detected by the second temperature sensor 32. Moreover, a fourth air fuel ratio sensor 14 for detecting the air fuel ratio of the exhaust gas, a third NOx sensor 23 for detecting the concentration of NOx in the exhaust gas and a third temperature sensor 33 for detecting the temperature of the exhaust gas are mounted on the exhaust passage 2 at locations downstream of the SCR catalyst 5. The air fuel ratio of the exhaust gas flowing out from the SCR catalyst 5 can be detected by the fourth air fuel ratio sensor 14. In addition, the concentration of NOx in the exhaust gas flowing out from the SCR catalyst 5 can be detected by the third NOx sensor 23. Further, the temperature of the SCR catalyst 5 can be detected by the third temperature sensor 33.

Here, note that it is not necessary to mount all the above-mentioned sensors, but some of them can be selected and mounted in a suitable manner. In addition, the second air fuel ratio sensor 12 and the first NOx sensor 21 may also be an integrated sensor. Moreover, the third air fuel ratio sensor 13 or the second NOx sensor 22 may also be an integrated sensor. Further, the fourth air fuel ratio sensor 14 and the third NOx sensor 23 may also be an integrated sensor. The temperatures of the individual catalysts can be estimated by an ECU 10 to be described later.

In the internal combustion engine 1, a fuel injection valve 6 is mounted on each cylinder for supplying fuel to the cylinder. Each fuel injection valve 6 may be a valve mechanism which serves to directly inject fuel into each corresponding cylinder of the internal combustion engine 1, or may be a valve mechanism which serves to inject fuel into an intake passage 7 or an intake port (not shown) of each corresponding cylinder. Moreover, the intake passage 7 is connected to the internal combustion engine 1. A throttle valve 8 for regulating the amount of intake air in the internal combustion engine 1 is arranged in the middle of the intake passage 7. An air flow meter 15 for detecting the amount of intake air in the internal combustion engine 1 is mounted on the intake passage 7 at a location upstream of the throttle valve 8.

In the internal combustion engine 1 constructed as mentioned above, there is arranged in combination therewith the ECU 10 which is an electronic control unit for controlling the internal combustion engine 1. This ECU 10 controls the internal combustion engine 1 in accordance with the operating conditions of the internal combustion engine 1 and/or driver's requirements.

Further, besides the above-mentioned sensors, an accelerator opening sensor 17, which serves to detect an engine load by outputting an electrical signal corresponding to an amount by which a driver depressed an accelerator pedal 16, and a crank position sensor 18, which serves to detect an engine rotational speed, are connected to the ECU 10 through electrical wiring, and the output signals of these variety of kinds of sensors are inputted to the ECU 10. On the other hand, the fuel injection valves 6 and the throttle valve 8 are connected to the ECU 10 through electrical wiring, so that these valves are controlled by means of the ECU 10.

For example, the ECU 10 decides a required amount of intake air from the accelerator opening degree detected by the accelerator opening sensor 17, and the engine rotational speed detected by the crank position sensor 18. Then, the degree of opening of the throttle valve 8 is controlled so that the amount of intake air detected by the air flow meter 15 becomes the required amount of intake air. Each of the fuel injection valves 6 is controlled in such a manner as to supply an amount of fuel injection in accordance with the amount of intake air which changes at this time. The air fuel ratio set at this time is an air fuel ratio which is set according to the operating state of the internal combustion engine 1. Then, in the internal combustion engine 1 according to this embodiment, an operation is carried out at a lean air fuel ratio. However, at such a time as cold start of the internal combustion engine 1, high load operation, etc., the operation of the internal combustion engine 1 is carried out at the stoichiometric air fuel ratio. At the time of the engine operation at the lean air fuel ratio, the fuel injection valves 6 or the throttle valve 8 is controlled so that the air fuel ratio of an air fuel mixture becomes 24, for example. In addition, at the time of the engine operation at the stoichiometric air fuel ratio, the injection valves 6 or the throttle valve 8 is controlled so that the air fuel ratio of the mixture becomes 14.7, for example.

In addition, the ECU 10 carries out a reduction treatment for the NOx stored in the NSR catalyst 4. At the time of the reduction treatment of the NOx stored in the NSR catalyst 4, so-called rich spike control is carried out in which the air fuel ratio of the exhaust gas flowing into the NSR catalyst 4 is temporarily made to decrease to a rich air fuel ratio, by adjusting at least one of the amount of fuel to be injected from each fuel injection valve 6 and the degree of opening of the throttle valve 8. Hereinafter, unless otherwise mentioned in particular, in cases where reference is simply made to "rich spike control", it indicates rich spike control which is intended to remove NOx from the NSR catalyst 4. The removal of NOx referred to herein includes reducing the NOx stored in the NSR catalyst 4, and causing the NOx stored in the NSR catalyst 4 to be released from the NSR catalyst 4, and the NOx thus released to flow out from the NSR catalyst 4, without being reduced.

The rich spike control for reducing the NOx stored in the NSR catalyst 4 is carried out, for example, in cases where the storage amount of NOx in the NSR catalyst 4 becomes an upper limit storage amount for which the rich spike control is required. The upper limit storage amount is a storage amount of NOx which is a value smaller than a maximum amount of NOx able to be stored by the NSR catalyst 4, and in which the NOx in the exhaust gas can not be stored by the NSR catalyst 4 to a sufficient extent during the operation at the lean air fuel ratio if NOx is not removed from the NSR catalyst 4, so that the NOx flowing out from the NSR catalyst 4 may become out of an allowable range. That is, the upper limit storage amount can be set to a storage amount of NOx at the time when it is on the verge of whether to start the rich spike control. The storage amount of NOx in the NSR catalyst 4 at the time of the rich spike control being not carried out is calculated, for example, by integrating a difference between the amount of NOx flowing into the NSR catalyst 4 and the amount of NOx flowing out from the NSR catalyst 4 without being reduced therein. The amount of NOx flowing into the NSR catalyst 4 and the amount of NOx flowing out from the NSR catalyst 4 can be respectively calculated based on the detected values of the first NOx sensor 21 and the second NOx sensor 22, and the amount of intake air detected by the air flow meter 15. In addition, the amount of NOx flowing into the NSR catalyst 4 can also be estimated based on the operating state of the internal combustion engine 1. Moreover, when the internal combustion engine 1 is operated at a lean air fuel ratio, the amount of NOx reduced by the NSR catalyst 4 is set to zero. When the storage amount of NOx in the NSR catalyst 4 reaches the upper limit storage amount, the rich spike control is started and the storage amount of NOx in the NSR catalyst 4 decreases. In cases where the rich spike control is carried out, it is carried out until the storage amount of NOx in the NSR catalyst 4 becomes equal to or less than a lower limit storage amount. This lower limit storage amount is a threshold value set in order to secure sufficient NOx storage capacity in the NSR catalyst 4, and is also a value at which it can be said that the reduction of the NOx stored in the NSR catalyst 4 has been completed. The lower limit storage amount may also be substantially 0. The NOx storage amount during the rich spike control is calculated by subtracting a storage amount of NOx which decreases per unit time during the rich spike control, from a storage amount of NOx at the time of the start of the rich spike control. Because the storage amount of NOx in the NSR catalyst 4 decreasing per unit time during the rich spike control is associated with the temperature of the NSR catalyst 4, the flow rate of the exhaust gas and the air fuel ratio of the exhaust gas, the relation among them can be obtained by experiments, simulations, or the like in advance. The storage amount of NOx decreasing during the rich spike control can be calculated based on this relation. Here, note that the flow rate of the exhaust gas is in the correlation with a detected value of the air flow meter 15, and so, it is obtained by using the detected value of the air flow meter 15. The storage amount of NOx in the NSR catalyst 4 may be calculated not only by the above-mentioned method but also by other well-known methods. In this manner, the ECU 10 estimates the storage amount of NOx in the NSR catalyst 4 at any time. Here, note that in this embodiment, the ECU 10, which carries out rich spike control for reducing NOx, corresponds to a controller in the present invention.

Moreover, by carrying out the rich spike control, ammonia may be produced in the three-way catalyst 3 or the NSR catalyst 4. With this ammonia being caused to adsorb to the SCR catalyst 5, it becomes possible to reduce NOx in the SCR catalyst 5. Here, note that an optimal air fuel ratio in the case of supplying ammonia to the SCR catalyst 5 is different from an optimal air fuel ratio in the case of reducing the NOx stored in the NSR catalyst 4. Accordingly, an air fuel ratio at the time of rich spike control for supplying ammonia to the SCR catalyst 5 (hereinafter, also referred to as rich spike control for the supply of ammonia) is different from an air fuel ratio at the time of rich spike control for reducing the NOx stored in the NSR catalyst 4. This rich spike control for the supply of ammonia is carried out at the time when an amount of ammonia adsorbed to the SCR catalyst 5 has decreased to a lower limit adsorption amount. The lower limit adsorption amount is set in such a manner that an NOx removal or reduction rate in the SCR catalyst 5 becomes within an allowable range. Here, note that the rich spike control for the supply of ammonia may be carried out at a predetermined interval. Then, the rich spike control for the supply of ammonia is carried out until the amount of ammonia adsorbed by the SCR catalyst 5 becomes a amount of ammonia to be targeted (hereinafter, also referred to as a target amount of ammonia). This target amount of ammonia is set to be within a range in which the NOx removal or reduction rate in the SCR catalyst 5 is in the allowable range, and in which even if the temperature of the SCR catalyst 5 varies due to a variation in the temperature of the exhaust gas of the internal combustion engine 1 within an assumed range, the outflow of ammonia from the SCR catalyst 5 is permitted. Here, note that the rich spike control for the supply of ammonia may be carried out only in a period of time set in advance or may be carried out until ammonia begins to flow out from the SCR catalyst 5. Here, the third NOx sensor 23 also detects ammonia as well as NOx. By utilizing such a nature, it is possible to detect ammonia from flowing out from the SCR catalyst 5. Note that the outflow of ammonia from the SCR catalyst 5 is also referred to as ammonia slip.

The ECU 10 estimates the amount of adsorption of ammonia in the SCR catalyst 5 at any time. In this embodiment, the amount of adsorption of ammonia in the SCR catalyst 5 is estimated by integrating an amount of change per unit time of the amount of adsorption of ammonia in the SCR catalyst 5. The amount of change per unit time of the amount of adsorption of ammonia in the SCR catalyst 5 can be obtained by subtracting an amount of decrease per unit time of the amount of adsorption of ammonia from an amount of increase per unit time thereof. The amount of increase per unit time of the amount of adsorption of ammonia in the SCR catalyst 5 is an amount of ammonia per unit time flowing into the SCR catalyst 5, and this can be set to amounts of ammonia produced per unit time in the three-way catalyst 3 and the NSR catalyst 4. The amount of ammonia produced by the three-way catalyst 3 is in the correlation with the air fuel ratio of the exhaust gas flowing thereinto, the temperature of the three-way catalyst 3 and the flow rate of the exhaust gas, and hence, such a correlation has been obtained by experiments or simulations in advance. The amount of ammonia produced by the NSR catalyst 4 is in the correlation with the air fuel ratio of the exhaust gas flowing thereinto, the temperature of the NSR catalyst 4, the flow rate of the exhaust gas and the storage amount of NOx therein, and hence, such a correlation has been obtained by experiments or simulations in advance. Here, note that in this embodiment, because the ECU 10 estimates the amount of ammonia flowing into the SCR catalyst 5, the ECU 10 is provided with an inflow ammonia amount estimator in the present invention.

Further, the amount of decrease per unit time of the amount of adsorption of ammonia in the SCR catalyst 5 can be set to a total sum of an amount of ammonia consumed per unit time in the SCR catalyst 5 by means of the reduction reaction of NOx, and an amount of ammonia desorbed per unit time from the SCR catalyst 5. These will be described later. Then, the amount of adsorption of ammonia in the SCR catalyst 5 at the current point in time can be calculated by integrating an amount of change per unit time of the amount of adsorption of ammonia in the SCR catalyst 5.

The amount of ammonia consumed per unit time by the SCR catalyst 5 is associated with the NOx removal or reduction rate in the SCR catalyst 5, the flow rate of the exhaust gas per unit time of the internal combustion engine 1, and the concentration of NOx in the exhaust gas flowing into the SCR catalyst 5, and so, it can be calculated based on these values.

The NOx removal or reduction rate in the SCR catalyst 5 is associated with the temperature of the SCR catalyst 5, the flow rate of the exhaust gas, and the amount of adsorption of ammonia in the SCR catalyst 5, and so, it can be calculated based on these values. For the amount of adsorption of ammonia in the SCR catalyst 5, there is used the value thereof calculated last time. That is, the amount of adsorption of ammonia is calculated in a repeated manner, so the amount of adsorption of ammonia calculated last time is used for calculation of the current NOx reduction rate. The NOx removal or reduction rate in the SCR catalyst 5 can be calculated by obtaining in advance the relation among the NOx removal or reduction rate, the temperature of the SCR catalyst 5, the flow rate of the exhaust gas, and the amount of adsorption of ammonia in the SCR catalyst 5. The relation among them may also have been made into a map in advance.

In addition, the amount of ammonia desorbed per unit time from the SCR catalyst 5 is associated with the temperature of the SCR catalyst 5, and the amount of adsorption of ammonia in the SCR catalyst 5 calculated last time, and so, it can be calculated based on these values. By obtaining in advance the relation among the temperature of the SCR catalyst 5, the amount of adsorption of ammonia therein, and the amount of desorbed ammonia by experiments, simulations or the like, the amount of desorbed ammonia can be obtained based on the temperature of the SCR catalyst 5 and the amount of adsorption of ammonia therein. The relation among them may also have been made into a map in advance.

As described above, it is possible to calculate the amount of change per unit time of the amount of adsorption of ammonia in the SCR catalyst 5. The amount of adsorption of ammonia at the current point in time can be calculated by integrating this value. Here, note that the amount of change in the amount of adsorption of ammonia is calculated at each operation period of the ECU 10, and the amount of adsorption of ammonia at the current point in time can also be calculated by integrating this amount of change. In addition, note that well-known techniques can also be used for the calculation of the amount of adsorption of ammonia in the SCR catalyst 5.

In this manner, by always grasping the storage amount of NOx in the NSR catalyst 4 and the amount of adsorption of ammonia in the SCR catalyst 5, and maintaining these amounts at appropriate values, respectively, it is possible to maintain the NOx reduction rate in the system as a whole at a high level. However, depending on the operating state of the internal combustion engine 1, the temperature of the NSR catalyst 4 becomes low, and the activity thereof drops, so that a period of time to carry out the rich spike control for decreasing the storage amount of NOx in the NSR catalyst 4 may become long. In this case, before the storage amount of NOx in the NSR catalyst 4 becomes equal to or less than the lower limit storage amount, the SCR catalyst 5 may become unable to fully adsorb the ammonia produced with the reduction of NOx, thus giving rise to a fear that ammonia may flow out from the SCR catalyst 5. Accordingly, in the case where the outflow of ammonia from the SCR catalyst 5 is estimated or detected, the ECU 10 makes the target air fuel ratio at the time of the rich spike control higher within the range of the rich air fuel ratio, than in the case where it is not estimated or detected. Here, in the case where the outflow of ammonia from the SCR catalyst 5 is not estimated or detected, ordinary rich spike control is carried out. The air fuel ratio at the time of the ordinary rich spike control referred to herein is an air fuel ratio which is most suitable for the reduction of the NOx stored in the NSR catalyst 4. Thus, the rich spike control, which is carried out at an air fuel ratio of the exhaust gas suitable for the reduction of the NOx stored in the NSR catalyst 4, is hereinafter referred to as the "ordinary rich spike control".

The target air fuel ratio after making high the target air fuel ratio at the time of the rich spike control is an air fuel ratio which is higher than the air fuel ratio most suitable for reducing NOx in the NSR catalyst 4, and which is, at the same time, higher than an air fuel ratio most suitable for producing ammonia in the three-way catalyst 3 or the NSR catalyst 4. This target air fuel ratio after having been made high is an air fuel ratio at which the amount of NOx to be reduced in the NSR catalyst 4 decreases, but the amount of NOx to be released therefrom increases, as compared with the target air fuel ratio before having been made high, and at which the amount of production of ammonia decreases. Thus, the control in which the air fuel ratio of the exhaust gas flowing into the NSR catalyst 4 is made high during the rich spike control is hereinafter also referred to as "air fuel ratio raising control".

Here, there has been found a phenomenon that under the environment in which oxygen is smaller than at the time of the lean air fuel ratio and the reducing agent is also smaller than at the time of the ordinary rich spike control, the NOx stored in the NSR catalyst 4 functions as a reducing agent, whereby a larger amount of NOx is released from the NSR catalyst 4. According to this phenomenon, a larger amount of NOx can be caused to be released by carrying out the rich spike control with the target air fuel ratio being made higher than that at the time of the ordinary rich spike control. By utilizing this phenomenon, the air fuel ratio raising control promotes the release of NOx from the NSR catalyst 4. That is, by carrying out the air fuel ratio raising control, the NSR catalyst 4 can be placed under the environment in which oxygen and the reducing agent are smaller, thus making it possible to promote the release of NOx from the NSR catalyst 4. On the other hand, in this air fuel ratio raising control, NOx is released from the NSR catalyst 4, but will arrive at the SCR catalyst 5, while a part of the NOx being not reduced due to the shortage of the reducing agent. The air fuel ratio raising control is carried out in the case where the outflow of ammonia from the SCR catalyst 5 is estimated or detected, and hence, when the air fuel ratio raising control is started, ammonia has already been adsorbed in the SCR catalyst 5. For this reason, the NOx released from the NSR catalyst 4 is reduced in the SCR catalyst 5. That is, even if NOx is not reduced in the NSR catalyst 4 but flows out from the NSR catalyst 4, this NOx is reduced in the SCR catalyst 5, and hence, is suppressed from flowing out from the SCR catalyst 5. As a result of this, the NOx reduction ability of the system as a whole can be maintained. Moreover, the ammonia adsorbed to the SCR catalyst 5 is consumed for the reduction of NOx, so that the amount of adsorption of ammonia in the SCR catalyst 5 can be decreased. Further, the amounts of ammonia produced in the three-way catalyst 3 and the NSR catalyst 4 are decreased by making the air fuel ratio high in the range of the rich air fuel ratio. Accordingly, the amount of ammonia to be supplied to the SCR catalyst 5 is decreased.

In this manner, in the air fuel ratio raising control, the rich spike control is carried out with the air fuel ratio being made higher than at the time of the ordinary rich spike control, whereby the amount of ammonia to be supplied to the SCR catalyst 5 and the amount of ammonia adsorbed to the SCR catalyst 5 can be decreased, while decreasing the storage amount of NOx in the NSR catalyst 4, as a result of which it is possible to suppress the ammonia from flowing out from the SCR catalyst 5.

FIG. 2 is a time chart showing, in order from the top to bottom, the changes over time of the air fuel ratio of exhaust gas, the amount of NOx stored in the NSR catalyst 4, the amount of ammonia produced by the three-way catalyst 3 and the NSR catalyst 4, and the amount of ammonia flowing out from the SCR catalyst 5, when the rich spike control is carried out. The air fuel ratio in FIG. 2 is the target air fuel ratio of the exhaust gas flowing into the NSR catalyst 4. Solid lines indicate the case where the activity of the NSR catalyst 4 is low and the air fuel ratio raising control according to this embodiment is carried out; broken lines indicate the case where the activity of the NSR catalyst 4 is high and the ordinary rich spike control is carried out; and alternate long and short dash lines indicate the case where the activity of the NSR catalyst 4 is low and the ordinary rich spike control is carried out.

At a point in time indicated by T1, the storage amount of NOx in the NSR catalyst 4 reaches the upper limit storage amount, and the rich spike control is started. The target air fuel ratio at this time is an air fuel ratio at the time of the rich spike control, in any case. Here, even if the rich spike control is carried out at the same air fuel ratio, in the case where the activity of the NSR catalyst 4 is high (broken line), the storage amount of NOx in the NSR catalyst 4 decreases more quickly than in the case where the activity on the NSR catalyst 4 is low (solid line and alternate long and short dash line). In addition, when the rich spike control is started, ammonia is produced in the three-way catalyst 3 and the NSR catalyst 4. In the case where the activity of the NSR catalyst 4 is high (broken line), the reduction of the NOx stored in the NSR catalyst 4 is completed at a point in time indicated by T2, and the target air fuel ratio is returned to the lean air fuel ratio.

On the other hand, in the case where the activity of the NSR catalyst 4 is low (solid line and alternate long and short dash line), the reduction of the NOx stored in the NSR catalyst 4 is not completed at the point in time T2, so that the rich spike control continues. Due to this continuation of the rich spike control, the production of ammonia continues in the three-way catalyst 3 and the NSR catalyst 4. Then, the amount of adsorption of ammonia in the SCR catalyst 5 reaches an upper limit at a point in time indicated by T3, and the amount of ammonia flowing out to the downstream side of the SCR catalyst 5 increases. In the air fuel ratio raising control according to this embodiment, the target air fuel ratio is made high within the range of the rich air fuel ratio from the point in time indicated by T3. That is, the target air fuel ratio is brought close to the stoichiometric air fuel ratio in such a manner that the air fuel ratio of the exhaust gas flowing into the NSR catalyst 4 is changed from the air fuel ratio suitable for the reduction of NOx in the NSR catalyst 4 to an air fuel ratio suitable for causing NOx to be released from the NSR catalyst 4 and to flow out from the NSR catalyst 4, while the NOx being not reduced. The target air fuel ratio at this time is an air fuel ratio at which the amount of NOx flowing out from the NSR catalyst 4 becomes more than that at a target air fuel ratio in a period of time of T1 to T3, and at which the amounts of ammonia produced in the three-way catalyst 3 and the NSR catalyst 4 become smaller than those at the target air fuel ratio in the period of time of T1 to T3. In this manner, by decreasing the amount of production of ammonia, the amount of adsorption of ammonia in the SCR catalyst 5 is suppressed from being increased, and by causing NOx to flow out from the NSR catalyst 4, the amount of adsorption of ammonia in the SCR catalyst 5 is decreased, whereby the outflow of ammonia from the SCR catalyst 5 is suppressed. Moreover, the storage amount of NOx in the NSR catalyst 4 is decreased by making the target air fuel ratio high so as to continue the rich spike control.

The timing at which the air fuel ratio raising control is started in this embodiment may also be a point in time at which ammonia is detected by the third NOx sensor 23, or may also be a point in time at which the amount of adsorption of ammonia to be estimated reaches an upper limit adsorption amount. The upper limit adsorption amount is a larger value than the target amount of ammonia, and is an amount of adsorption of ammonia which becomes the boundary of whether the amount of ammonia flowing out from the SCR catalyst 5 exceeds an allowable range.

FIG. 3 is a flow chart showing a flow or routine for the rich spike control for reducing the NOx stored in the NSR catalyst 4 according to this first embodiment of the present invention. The routine in this flow chart is carried out by means of the ECU 10 at each predetermined time interval.

In step S101, it is determined whether a condition for carrying out the rich spike control is satisfied. In this step S101, it is determined whether the operating condition of the internal combustion engine 1 (e.g., the engine rotation speed and the engine load) is applied to a condition suitable for carrying out the rich spike control. The condition suitable for carrying out the rich spike control has been obtained by experiments, simulations, or the like in advance. In cases where an affirmative determination is made in step S101, the routine goes to step S102, whereas in cases where a negative determination is made, the routine goes to step S106. In step S106, in cases where the rich spike control is carried out, the rich spike control is terminated, whereas in cases where the rich spike control is not carried out, the routine in this flow chart is ended, without carrying out the rich spike control.

On the other hand, in step S102, the storage amount of NOx in the NSR catalyst 4 is read in. The ECU 10 calculates the storage amount of NOx in the NSR catalyst 4 at any time, based on the amount of NOx flowing into the NSR catalyst 4, the amount of NOx flowing out from the NSR catalyst 4, and the amount of NOx reduced in the NSR catalyst 4, and in this step, this value calculated by the ECU 10 is read in.

In step S103, it is determined whether the rich spike control is carried out. This rich spike control is any of the rich spike control which will be started or continued in step S110 to be described later, or the ordinary rich spike control which will be started or continued in step S111. In cases where an affirmative determination is made in step S103, the routine goes to step S104, whereas in cases where a negative determination is made, the routine goes to step S107.

In step S104, it is determined whether the storage amount of NOx in the NSR catalyst 4 during the rich spike control is equal to or less than the lower limit storage amount. This lower limit storage amount is a storage amount of NOx in which the rich spike control for removing the NOx stored in the NSR catalyst 4 may be terminated. That is, in this step S104, it is determined whether the rich spike control to be started or continued in step S110 to be described later or the ordinary rich spike control to be started or continued in step S111 to be described later may be terminated. In cases where an affirmative determination is made in step S104, the routine goes to step S105, where the rich spike control is terminated. On the other hand, in cases where a negative determination is made in step S104, the routine goes to step S108.

Then, in step S107, it is determined whether the storage amount of NOx in the NSR catalyst 4 is equal to or more than the upper limit storage amount. In this step S107, it is determined whether it is necessary to start the rich spike control. The upper limit storage amount has been obtained in advance by experiments, simulations or the like, and stored in the ECU 10. In cases where an affirmative determination is made in step S107, the routine goes to step S108, whereas in cases where a negative determination is made, this routine is ended.

In step S108, it is determined whether ammonia slip has occurred in the SCR catalyst 5. In cases where ammonia is detected at the downstream side of the SCR catalyst 5, a determination can be made that ammonia slip has occurred. Here, the third NOx sensor 23 detects NOx, and similarly detects ammonia in addition thereto. When the rich spike control is carried out, the amount of NOx flowing out from the NSR catalyst 4 is small, and in addition, NOx is reduced by the SCR catalyst 5, so there is almost no NOx which flows out from the SCR catalyst 5. For this reason, the detected value of the third NOx sensor 23 during the rich spike control corresponds to the concentration of ammonia. Accordingly, based on the detected value of the third NOx sensor 23, it can be determined whether ammonia slip has occurred. Here, note that in this embodiment, by carrying out the processing in step S108, the ECU 10 determines whether ammonia slip has occurred in the SCR catalyst 5, so the ECU 10 is provided with an ammonia outflow detector in the present invention.

Here, note that, in this step S108, instead of determining whether ammonia slip has actually occurred, if the rich spike control is carried out, it may be determined whether there is a fear that ammonia slip may occur. The ECU 10 calculates the amount of adsorption of ammonia in the SCR catalyst 5 at any time as described above, so that it can also calculate the amount of adsorption of ammonia in the SCR catalyst 5 in the case of carrying out the rich spike control. Then, in cases where this amount of adsorption of ammonia at the time of the rich spike control becomes more than the upper limit adsorption amount, a determination can be made that ammonia slip occurs. The upper limit adsorption amount has been obtained in advance by experiments, simulations or the like, and stored in the ECU 10. Here, note that the upper limit adsorption amount may have a certain amount of margin as a value smaller than the amount of adsorption of ammonia used as the boundary of whether the amount of ammonia flowing out from the SCR catalyst 5 exceeds the allowable range. In step S108, in cases where a determination is made that there is a fear that ammonia slip may occur, the air fuel ratio raising control can be carried out from the point in time of starting the rich spike control.

Moreover, in step S108, instead of the above-mentioned determination based on the amount of adsorption of ammonia, a determination can also be carried out based on the amount of desorption of ammonia. Here, in cases where the amount of ammonia flowing into the SCR catalyst 5 per unit time is large, even if the actual amount of adsorption of ammonia in the SCR catalyst 5 is equal to or less than the upper limit adsorption amount, the SCR catalyst 5 may become unable to fully adsorb ammonia, so that ammonia slip may occur. The ammonia slip in this case can also be estimated. As described above, the ECU 10 calculates the current amount of desorption of ammonia in the SCR catalyst 5 at any time, based on the temperature of the SCR catalyst 5, and the amount of adsorption of ammonia in the SCR catalyst 5 calculated last time, and hence, in cases where this amount of adsorption of ammonia becomes more than an adsorption amount threshold value, a determination can be made that ammonia slip has occurred. The adsorption amount threshold value is an amount of desorption of ammonia used as the boundary of whether the amount of ammonia flowing out from the SCR catalyst 5 exceeds the allowable range, and it has been obtained by experiments, simulations or the like, and stored in the ECU 10 in advance.

Further, in step S108, instead of determining, based on the detected value of the third NOx sensor 23, whether ammonia slip has occurred, it may be determined whether ammonia slip has occurred, based on at least one of the temperature of the NSR catalyst 4 and the flow rate of the exhaust gas, in addition to the amount of adsorption of ammonia in the SCR catalyst 5. Here, in cases where the temperature of the NSR catalyst 4 is low, or in cases where the flow rate of the exhaust gas is small, the activity of the NSR catalyst 4 becomes low, so it becomes difficult for NOx to be released from the NSR catalyst 4. As a result, in cases where the amount of adsorption of ammonia in the SCR catalyst 5 is equal to or more than a predetermined amount of adsorption, there will be a high possibility of the ammonia flowing out from the SCR catalyst 5. Accordingly, in at least one of the case where the temperature of the NSR catalyst 4 is less than a predetermined temperature, and the case where the flow rate of the exhaust gas is less than a predetermined flow rate, and at the same time, in the case where the amount of adsorption of ammonia in the SCR catalyst 5 is equal to or more than a predetermined amount of adsorption, the ECU 10 may estimate that ammonia slip occurs. The predetermined temperature, the predetermined flow rate and the predetermined amount of adsorption have been obtained in advance through experiments, simulations or the like.

In addition, by combining the above-mentioned determinations in an appropriate manner, it may be determined whether ammonia slip has occurred. In cases where an affirmative determination is made in step S108, the routine goes to step S109, whereas in cases where a negative determination is made, the routine goes to step S111.

A target air fuel ratio is calculated in step S109. The target air fuel ratio in this case is a target air fuel ratio at the time of the air fuel ratio raising control, and is also an air fuel ratio suitable for suppressing the production of ammonia in the three-way catalyst 3 and the NSR catalyst 4, as well as for causing NOx to flow out from the NSR catalyst 4. The target air fuel ratio calculated in this step S109 is an air fuel ratio, in the range of the rich air fuel ratio, higher than a target air fuel ratio at the time of the ordinary rich spike control to be started or continued in the step S111 to be described later. That is, the release of NOx from the NSR catalyst 4 is promoted by bringing the target air fuel ratio close to the stoichiometric air fuel ratio in the range of the rich air fuel ratio, but at this time, the reducing agent is short or insufficient in the NSR catalyst 4, so that the NOx released from the NSR catalyst 4 flows out from the NSR catalyst 4, while not being reduced. Due to this NOx, it is possible to decrease the amount of ammonia adsorption in the SCR catalyst 5. In addition, the amounts of ammonia production in the three-way catalyst 3 and the NSR catalyst 4 are decreased by bringing the target air fuel ratio close to the stoichiometric air fuel ratio. Accordingly, the amount of ammonia adsorption in the SCR catalyst 5 can be decreased in an effective manner. Here, note that in this step S109, the target air fuel ratio may be set to a fixed value stored in advance, but instead of this, the target air fuel ratio may be decided based on the storage amount of NOx in the NSR catalyst 4 or the amount of ammonia flowing into the SCR catalyst 5 (or this may also be the amount of ammonia flowing out from the NSR catalyst 4). Here, the larger the storage amount of NOx in the NSR catalyst 4, the larger becomes the amount of production of ammonia, and the higher becomes the possibility that ammonia flows out from the SCR catalyst 5. For this reason, the larger the storage amount of NOx in the NSR catalyst 4, the more the amount of production of ammonia is desired to be decreased, and in addition, the more the amount of NOx flowing out from the NSR catalyst 4 without being reduced is desired to be increased. On the other hand, by making the target air fuel ratio higher in the range of the rich air fuel ratio in accordance with the increasing storage amount of NOx in the NSR catalyst 4, the amount of production of ammonia therein can be decreased, and the amount of NOx flowing out from the NSR catalyst 4 without being reduced can be increased. In addition, in order to suppress ammonia from flowing out from the SCR catalyst 5, it is desirable to decrease the amount of ammonia flowing into the SCR catalyst 5 (this may also be the amount of ammonia flowing out from the NSR catalyst 4). That is, the more the amount of ammonia flowing into the SCR catalyst 5, the higher the target air fuel ratio may also be made in the range of the rich air fuel ratio. For example, a map in which the target air fuel ratio is obtained by using, as a parameter, at least one of the storage amount of NOx in the NSR catalyst 4 and the amount of ammonia flowing into the SCR catalyst 5 may have been obtained by experiments, simulations, or the like, and stored in the ECU 10 in advance. The storage amount of NOx in the NSR catalyst 4 and the amount of ammonia flowing into the SCR catalyst 5 are estimated by the ECU 10.

Then, in step S110, the target air fuel ratio is set to the value calculated in step S109, and the rich spike control is started or continued. That is, the air fuel ratio raising control is started or continued. The ECU 10 changes the air fuel ratio of the exhaust gas flowing into the NSR catalyst 4, by changing an amount of fuel injection, an amount of intake air, or the like thereby to change the air fuel ratio of a mixture in each cylinder of the internal combustion engine 1. Here, note that the target air fuel ratio may of course be changed in the course of carrying out the ordinary rich spike control, but in cases where the occurrence of ammonia slip is estimated before carrying out the ordinary rich spike control, rich spike control may be started at a target air fuel ratio higher than that in the ordinary rich spike control, from the beginning of the rich spike control.

On the other hand, in step S111, the ordinary rich spike control is started or continued. The ordinary rich spike control is the rich spike control which is carried out at a target air fuel ratio suitable for the reduction of the NOx stored in the NSR catalyst 4, as described above. By carrying out the ordinary rich spike control, NOx is released from the NSR catalyst, and the NOx thus released is reduced by the reducing agent. That is, in the ordinary rich spike control, the target air fuel ratio is set to an air fuel ratio at which the reducing agent for reducing the NOx released from the NSR catalyst 4 in the NSR catalyst 4 is supplied from the internal combustion engine 1. In addition, in the case where this ordinary rich spike control is being carried out, ammonia may be produced in the three-way catalyst 3 and the NSR catalyst 4, and this ammonia may be supplied to the SCR catalyst 5. In cases where the ammonia slip is eliminated after the air fuel ratio raising control is started, a negative determination is made in step S108, and the ordinary rich spike control is started, but instead of this, after the air fuel ratio raising control is started, the air fuel ratio raising control may be continued until the storage amount of NOx in the NSR catalyst 4 becomes equal to or less than the lower limit storage amount. Moreover, in step S108, in cases where the air fuel ratio raising control is already being carried out, a determination may be made that the ammonia slip has been eliminated, after the amount of adsorption of ammonia in the SCR catalyst 5 has decreased to some extent from the upper limit adsorption amount. According to this, it is possible to suppress the starting and termination of the air fuel ratio raising control from being repeated frequently.

Here, note that in this embodiment, the three-way catalyst 3 is provided, but instead of this, there may be used an arrangement in which the three-way catalyst 3 is not provided. In this case, it may be considered that in the description mentioned above, there is no production of ammonia in the three-way catalyst 3. Accordingly, the ammonia produced only in the NSR catalyst 4 is supplied to the SCR catalyst 5. Thus, by calculating the storage amount of NOx in the NSR catalyst 4 and the amount of adsorption of ammonia in the SCR catalyst 5 in this manner, the rich spike control and the air fuel ratio raising control can be carried out similarly as explained above.

As described above, in this embodiment, in cases where ammonia slip occurs in the SCR catalyst 5, at the time of carrying out the rich spike control in order to remove the NOx stored in the NSR catalyst 4, the target air fuel ratio in the rich spike control is made high within the range of the rich air fuel ratio. With this, the amounts of ammonia produced in the three-way catalyst 3 and the NSR catalyst 4 can be decreased, so that the occurrence of ammonia slip in the SCR catalyst 5 can be decreased. Further, by causing NOx to flow out from the NSR catalyst 4, the NOx and ammonia are caused to react with each other in the SCR catalyst 5, so that the amount of ammonia adsorption in the SCR catalyst 5 can be decreased. Thus, according to this, too, the occurrence of ammonia slip in the SCR catalyst 5 can be decreased. In addition, because NOx is released from the NSR catalyst 4, the storage amount of NOx in the NSR catalyst 4 can be decreased, so that it becomes possible to store NOx in the NSR catalyst 4 after the air fuel ratio raising control.

Second Embodiment

In this second embodiment, when the air fuel ratio raising control is carried out, oxygen and unburnt fuel are caused to discharge from the internal combustion engine 1, whereby the temperature of the NSR catalyst 4 is raised, and the release of NOx from the NSR catalyst 4 is promoted. Here, note that in the following, this control to raise the temperature of the NSR catalyst 4 is also referred to as "temperature rise control". The other components and so on in this second embodiment are the same as those in the first embodiment, so the explanation thereof is omitted.

Here, when the temperature of the NSR catalyst 4 becomes low due to the long-continued idling operation of the internal combustion engine 1, etc., the activity of the NSR catalyst 4 will decrease, so that even if the air fuel ratio raising control is carried out as explained in the first embodiment, it can become difficult for NOx to be released from the NSR catalyst 4. In this case, according to this second embodiment, temperature rise control is not carried out. Here, by supplying oxygen and unburnt fuel to the three-way catalyst 3, the unburnt fuel is oxidized in the three-way catalyst 3, and at this time, heat is generated. The temperatures of the three-way catalyst 3 and the NSR catalyst 4 are caused to go up due to this heat. That is, even if the temperature of the NSR catalyst 4 becomes low due to the long-continued idling operation of the internal combustion engine 1, etc., the temperature of the NSR catalyst 4 can be made high. Then, due to the rise in the temperature of the NSR catalyst 4, the activity of the NSR catalyst 4 becomes high, so that the release of NOx from the NSR catalyst 4 can be promoted. In addition, the release of NOx from the NSR catalyst 4 can be promoted, by carrying out the temperature rise control so that the air fuel ratio of the exhaust gas flowing out from the three-way catalyst 3 becomes the same air fuel ratio as the target air fuel ratio at the time of the air fuel ratio raising control explained in the first embodiment, due to the mixing of exhaust gas of a rich air fuel ratio and exhaust gas of a lean air fuel ratio in the three-way catalyst 3. That is, in this second embodiment, the air fuel ratio(s) of mixture(s) in all the cylinders or each cylinder of the internal combustion engine 1 is (are) changed within a range in which the air fuel ratio of the exhaust gas flowing into the NSR catalyst 4 becomes the same air fuel ratio as the target air fuel ratio at the time of the air fuel ratio raising control explained in the first embodiment.

Some methods can be considered in order to discharge large amounts of oxygen and unburnt fuel from the internal combustion engine 1 for the temperature rise control. For example, in all the cylinders of the internal combustion engine 1, at least one cycle of operation is performed at a rich air fuel ratio, and then, at least one cycle of operation is performed at a lean air fuel ratio in all the cylinders, and after that, these operations are repeated in an alternate manner. In that case, a large amount of unburnt fuel is discharged at the time of the rich air fuel ratio, and a large amount of oxygen is discharged at the time of the lean air fuel ratio. With this, an exhaust gas containing a large amount of unburnt fuel and an exhaust gas containing a large amount of oxygen flow into the three-way catalyst 3 in an alternate manner. These unburnt fuel and oxygen react with each other in the three-way catalyst 3 to generate reaction heat. At this time, the air fuel ratios of mixtures in all the cylinders of the internal combustion engine 1 are each made to change between the rich air fuel ratio and the lean air fuel ratio in an alternate manner so that the air fuel ratio of the exhaust gas flowing into the NSR catalyst 4 becomes the same air fuel ratio as the target air fuel ratio at the time of the air fuel ratio raising control calculated in the first embodiment. In this case, the air fuel ratios of all the cylinders are changed so that an average value between the air fuel ratios in a period of time in which the engine is operated at the rich air fuel ratio and the air fuel ratios in a period of time in which the engine is operated at the lean air fuel ratio becomes the same air fuel ratio as the target air fuel ratio at the time of the air fuel ratio raising control calculated in the first embodiment. In that case, exhaust gases of the rich air fuel ratio and exhaust gases of the rich air fuel ratio are mixed with each other by the three-way catalyst 3, so that the air fuel ratio of the mixed exhaust gas becomes the same air fuel ratio as the target air fuel ratio at the time of the air fuel ratio raising control set in the first embodiment, when the exhaust gas of the internal combustion engine 1 flows into the NSR catalyst 4. Moreover, the capacity of the three-way catalyst 3 may be set in advance in such a manner that the air fuel ratio of the exhaust gas becomes the same air fuel ratio as the target air fuel ratio at the time of the air fuel ratio raising control set in the first embodiment, when the exhaust gas flows into the NSR catalyst 4.

In addition, in cases where the internal combustion engine 1 is provided with a plurality of cylinders, oxygen and unburnt fuel can be made to discharge from the internal combustion engine 1 by changing the air fuel ratio of a mixture in each of the cylinders, too. That is, more oxygen is released from a cylinder in which the air fuel ratio of the mixture is set to a lean air fuel ratio, and more unburnt fuel is released from a cylinder in which the air fuel ratio of the mixture is set to a rich air fuel ratio. Accordingly, reaction heat is generated by the oxygen and unburnt fuel being supplied to the three-way catalyst 3. At this time, the air fuel ratio of the mixture in each of the cylinders is set in such a manner that the air fuel ratio of the exhaust gas flowing into the NSR catalyst 4 becomes the same air fuel ratio as the target air fuel ratio at the time of the air fuel ratio raising control calculated in the first embodiment. In this case, the ratio of the amounts of intake air and the amounts of fuel injection in all the cylinders, i.e., the air fuel ratio in each cylinder will be set in such a manner that an average value of the air fuel ratios of mixtures in all the cylinders becomes the same air fuel ratio as the target air fuel ratio at the time of the air fuel ratio raising control calculated in the first embodiment. In that case, when the exhaust gas of the internal combustion engine 1 flows into the NSR catalyst 4, the air fuel ratio of the exhaust gas becomes the same air fuel ratio as the target air fuel ratio at the time of the air fuel ratio raising control set in the first embodiment. Further, the capacity of the three-way catalyst 3 may be set in advance in such a manner that the air fuel ratio of the exhaust gas becomes the same air fuel ratio as the target air fuel ratio at the time of the air fuel ratio raising control set in the first embodiment, when the exhaust gas flows into the NSR catalyst 4.

In cases where the air fuel ratio of the internal combustion engine 1 is made to vary between the lean air fuel ratio and the rich air fuel ratio, as mentioned above, the larger the difference between the lean air fuel ratio and the rich air fuel ratio, the larger become the amount of oxygen and the amount of unburnt fuel to be supplied to the three-way catalyst 3, and hence, the higher become the temperatures of the three-way catalyst 3 and the NSR catalyst 4. Similarly, in cases where the air fuel ratio is changed for each cylinder, the larger the difference in the air fuel ratio between the cylinders of the lean air fuel ratio and the cylinders of the rich air fuel ratio, the higher the temperatures of the three-way catalyst 3 and the NSR catalyst 4 become, so that the release of NOx from the NSR catalyst 4 is promoted. Accordingly, the air fuel ratio may be adjusted according to the amount of NOx released from the NSR catalyst 4. For example, the difference between the lean air fuel ratio and the rich air fuel ratio may be made larger in the case where the amount of release of NOx per unit time from the NSR catalyst 4 is small than in the case where it is large.

However, when the temperatures of the three-way catalyst 3 and the NSR catalyst 4 are caused to go up by carrying out the temperature rise control, the temperature of the SCR catalyst 5 will also go up. As the temperature of the SCR catalyst 5 becomes higher, it becomes easier for ammonia to be desorbed from the SCR catalyst 5. That is, ammonia slip may occur. Accordingly, in this second embodiment, the air fuel ratio (i.e., target air fuel ratio) of the exhaust gas flowing into the NSR catalyst 4 may be changed in consideration of the ammonia slip in the SCR catalyst 5.

Specifically, the higher the temperature of the SCR catalyst 5, the higher the target air fuel ratio may also be made within the range of the rich air fuel ratio. By making the target air fuel ratio higher within the range of the rich air fuel ratio, the amounts of ammonia produced in the three-way catalyst 3 and the NSR catalyst 4 are decreased, so that the amount of ammonia to be supplied to the SCR catalyst 5 is decreased. As a result of this, it is possible to suppress the occurrence of ammonia slip. Moreover, by making the target air fuel ratio higher within the range of the rich air fuel ratio, a larger amount of NOx flows out from the NSR catalyst 4, so that the larger amount of NOx can be supplied to the SCR catalyst 5. For that reason, the ammonia being about to desorb from the SCR catalyst 5 can be quickly consumed by NOx, before desorbing from the SCR catalyst 5, and with this, too, it is possible to suppress the occurrence of ammonia slip.

FIG. 4 is a flow chart showing a flow or routine for the rich spike control for reducing the NOx stored in the NSR catalyst 4 according to this second embodiment of the present invention. The routine in this flow chart is carried out by means of the ECU 10 at each predetermined time interval. For those steps in which the same processing as in the flow chart shown in FIG. 3 is carried out, the same symbols are attached and an explanation thereof is omitted. In addition, for those steps in which the same processing as in the flow shown in FIG. 3 is carried out, a part of their illustration is omitted.

In the flow chart or routine shown in FIG. 4, when the processing of step S110 is ended, the routine goes to step S201. In step S201, it is determined whether the amount of NOx released per unit time from the NSR catalyst 4 during the air fuel ratio raising control being carried out is equal to or more than a predetermined release amount. In this step S201, it is determined whether the amount of NOx released per unit time from the NSR catalyst 4 is sufficiently large. The amount of NOx released per unit time is associated with the temperature of the NSR catalyst 4, the storage amount of NOx, the flow rate of the exhaust gas, the air fuel ratio, etc., and hence, it is estimated based on these values by means of the ECU 10. The relation between them has been obtained in advance by experiments, simulations or the like, and stored in the ECU 10. Here, note that in this embodiment, the ECU 10 estimates the amount of NOx released per unit time from the NSR catalyst 4, so the ECU 10 is provided with a release amount detector in the present invention. In cases where a negative determination is made in step S201, the routine goes to step S202.

In step S202, temperature rise control is started. That is, the air fuel ratios of all the cylinders of the internal combustion engine 1 are alternately changed between the rich air fuel ratio and the lean air fuel ratio. In this step S202, the air fuel ratio of the internal combustion engine 1 is made to vary in such a manner that the air fuel ratio of the exhaust gas flowing into the NSR catalyst 4 (this may also be an average air fuel ratio of the internal combustion engine 1 in a predetermined period of time) becomes the same air fuel ratio as the target air fuel ratio calculated in step S109. The predetermined period of time in this case can be, for example, a period of time from the start of the rich air fuel ratio to the end of the following lean air fuel ratio, or a period of time from the start of the lean air fuel ratio to the end of the following rich air fuel ratio. Here, note that instead of setting the air fuel ratios of all the cylinders to the same air fuel ratio, the air fuel ratios of the individual cylinders may be changed in such a manner that there exist cylinders of rich air fuel ratio and cylinders of lean air fuel ratio. At this time, the air fuel ratios of the individual cylinders are set in such a manner that the air fuel ratio of the exhaust gas flowing into the NSR catalyst 4 (this may also be an average air fuel ratio of all the cylinders in a predetermined period of time) becomes the same air fuel ratio as the target air fuel ratio calculated in step S109. The predetermined period of time in this case may be a period of time until one cycle passes in all the cylinders, or may also be a period of time until an arbitrary number of cycles more than one cycle pass. Here, note that in cases where the air fuel ratio is changed in each cylinder, there may be a cylinder which is operated at the stoichiometric air fuel ratio, or there may be a cylinder in which fuel is not injected. The air fuel ratios of the individual cylinders may be fixed values, or may be made to change according to conditions. Even if the temperature rise control is started by this step S202, it can be said that the rich spike control continues, because the air fuel ratio of the exhaust gas flowing into the NSR catalyst 4 is the rich air fuel ratio. When the processing of step S202 ends, this routine is once ended.

Here, note that in the temperature rise control, as mentioned above, the higher the temperature of the SCR catalyst 5, the higher the air fuel ratio of the exhaust gas flowing into the NSR catalyst 4 (i.e., the target air fuel ratio) may also be made within the range of the rich air fuel ratio. As a result of this, it is possible to suppress the occurrence of ammonia slip from the SCR catalyst 5. In order to make high the air fuel ratio of the exhaust gas flowing into the NSR catalyst 4, it is only necessary to make high the air fuel ratio of each cylinder of the internal combustion engine 1 in the temperature rise control. The relation between the temperature of the SCR catalyst 5 and the target air fuel ratio may be obtained by experiments, simulations, or the like in advance.

On the other hand, in cases where a positive determination is made in step S201, the routine goes to step S203. In step S203, it is determined whether the temperature rise control is being carried out. Because in step S201, the determination is made that the amount of NOx released from the NSR catalyst 4 has become sufficiently large, the temperature rise control is not necessary at this time. Accordingly, in cases where the temperature rise control is carried out, the temperature rise control is terminated. For this reason, in cases where an affirmative determination is made in step S203, the routine goes to step S204, where the temperature rise control is terminated. Here, note that when the temperature rise control is terminated immediately after the amount of NOx released per unit time from the NSR catalyst 4 becomes equal to or more than the predetermined release amount, there is a fear that the start and termination of the temperature rise control may be repeated frequently. For this reason, the temperature rise control may be terminated after the amount of NOx released per unit time from the NSR catalyst 4 has become larger to some extent than the predetermined release amount. On the other hand, in cases where a negative determination is made in step S203, this flow chart or routine is once ended.

Moreover, in the flow chart shown in FIG. 4, when a negative determination is made in step S108, the routine goes to step S205. In step S205, it is determined whether the temperature rise control is being carried out. Here, if ammonia slip has not occurred, there is no need for the temperature rise control. For this reason, in cases where an affirmative determination is made in step S205, the routine goes to step S206, where the temperature rise control is terminated. On the other hand, in cases where a negative determination is made in step S206, the routine goes to step S111.

As described above, according to this second embodiment, by making the temperature of the NSR catalyst 4 high, the release of NOx from the NSR catalyst 4 can be promoted. With this, the amount of ammonia adsorbed in the SCR catalyst 5 can be decreased, thus making it possible to suppress the ammonia from flowing out from the SCR catalyst 5.

Third Embodiment

Next, reference will be made to the case where when the temperature of the NSR catalyst 4 does not go up to a sufficient extent even if the temperature rise control is carried out, the difference between the lean air fuel ratio and the rich air fuel ratio is enlarged in the temperature rise control. FIG. 5 is a flow chart showing a flow or routine for the rich spike control for reducing the NOx stored in the NSR catalyst 4 according to this third embodiment of the present invention. The routine in this flow chart is carried out by means of the ECU 10 at each predetermined time interval. For those steps in which the same processing as in the flow chart shown in FIG. 3 or FIG. 4 is carried out, the same symbols are attached and an explanation thereof is omitted. In addition, for those steps in which the same processing as in the flow shown in FIG. 3 or FIG. 4 is carried out, a part of their illustration is omitted.

In the flow chart shown in FIG. 5, in cases where a negative determination is made in step S201, the routine goes to step S301. In step S301, it is determined whether the temperature rise control is being carried out. In cases where the amount of NOx released per unit time is less than the predetermined release amount, in spite of the temperature rise control being carried out, it is considered that the effect of the temperature rise of the NSR catalyst 4 by means of the temperature rise control is low. In such a case, in order to enhance the effect of the temperature rise control, the difference of the air fuel ratio at the time of the temperature rise control is made to increase. That is, the amounts of supply of unburnt fuel and oxygen to the three-way catalyst 3 and the NSR catalyst 4 are made to increase. For this reason, in cases where an affirmative determination is made in step S301, the routine goes to step S302.

In step S302, the difference between a maximum value and a minimum value of the air fuel ratio in the temperature rise control is adjusted. For example, in cases where the air fuel ratios of all the cylinders of the internal combustion engine 1 are changed between the lean air fuel ratio and the rich air fuel ratio in an alternate manner, the maximum value of the air fuel ratio is made higher, and the minimum value of the air fuel ratio is made lower. Further, the air fuel ratio of the exhaust gas flowing into the NSR catalyst 4 (this may also be an average value of the air fuel ratio of the internal combustion engine 1 in a predetermined period of time) is made to the same air fuel ratio as the target air fuel ratio calculated in step S109. On the other hand, in cases where the air fuel ratio is changed in each cylinder of the internal combustion engine 1, in cylinders of high air fuel ratio, the air fuel ratio is made further higher, and in cylinders of low air fuel ratio, the air fuel ratio is made further lower. In this case, too, the air fuel ratio of the exhaust gas flowing into the NSR catalyst 4 (this may also be an average value of the air fuel ratios of all the cylinders in a predetermined period of time) is made to the same air fuel ratio as the target air fuel ratio calculated in step S109. With this, the same effects as in the first embodiment can be obtained, and in addition, the temperature rise of the NSR catalyst 4 can be promoted. Here, note that by providing limits for the maximum value and the minimum value of the air fuel ratio, it is possible to suppress the deterioration of the combustion state and the deterioration of fuel economy. For example, the release of NOx from the NSR catalyst 4 is promoted due to the temperature rise of the NSR catalyst 4, but the amount of generation of NOx may be increased in the internal combustion engine 1. Then, when the NOx flowing out from the internal combustion engine 1 flows out from the three-way catalyst 3, without being able to be fully treated in the three-way catalyst 3, the decrease in the storage amount of NOx in the NSR catalyst 4 becomes slow. For this reason, the maximum value and the minimum value of the air fuel ratio in the temperature rise control may be adjusted in such a manner that the amount of NOx flowing out from the three-way catalyst 3 falls within an allowable range. In the case of changing the air fuel ratio, it may be changed by a predetermined value, or may be changed according to the amount of NOx released per unit time from the NSR catalyst 4. On the other hand, in cases where a negative determination is made in step S301, the routine goes to step S202, where the temperature rise control is started.

As described above, according to this third embodiment, by making the temperature of the NSR catalyst 4 high, the release of NOx from the NSR catalyst 4 can be promoted. As a result of this, the amount of ammonia adsorbed in the SCR catalyst 5 can be decreased, thus making it possible to suppress the ammonia from flowing out from the SCR catalyst 5.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An exhaust gas purification apparatus for an internal combustion engine which is able to be operated at a lean air fuel ratio, said apparatus comprising:

an NOx storage reduction catalyst that is arranged in an exhaust passage of said internal combustion engine, and serves to store NOx when an air fuel ratio of exhaust gas is a lean air fuel ratio, and to reduce the NOx thus stored when the air fuel ratio of the exhaust gas is equal to or less than a stoichiometric air fuel ratio, wherein ammonia is produced in a reducing atmosphere in which a predetermined amount of a reducing agent exists;

an NOx selective catalytic reduction catalyst that is arranged in said exhaust passage at a location downstream of said NOx storage reduction catalyst, and serves to adsorb ammonia and to reduce the NOx by using the ammonia thus adsorbed as a reducing agent;

an ammonia outflow detector configured to estimate or detect an outflow of ammonia from said NOx selective catalytic reduction catalyst; and
a controller comprising at least one processor configured to carry out a rich spike control in which an air fuel ratio of exhaust gas flowing into said NOx storage reduction catalyst is controlled to a rich air fuel ratio;
a release amount detector configured to estimate or detect an amount of NOx released per unit time from said NOx storage reduction catalyst; and
a three-way catalyst that is arranged in the exhaust passage at a location upstream of said NOx storage reduction catalyst;
wherein said internal combustion engine is provided with one or a plurality of cylinders;
wherein said controller further configured to carry out air fuel ratio raising control in which a target air fuel ratio of the exhaust gas flowing into said NOx storage reduction catalyst during said rich spike control is made higher within the range of the rich air fuel ratio, when the outflow of ammonia from said NOx selective catalytic reduction catalyst and the rich spike control is estimated or detected by said ammonia outflow detector, than when it is not estimated or detected;
when the amount of NOx released per unit time from said NOx storage reduction catalyst estimated or detected by said release amount detector in a state where said target air fuel ratio is made high in the range of the rich air fuel ratio by means of said air fuel ratio raising control becomes less than a predetermined release amount, said controller further configured to carry out temperature rise control in which an air fuel ratio of the internal combustion engine is changed so that oxygen and unburnt fuel are contained in the exhaust gas flowing into said three-way catalyst, while controlling the air fuel ratio of the exhaust gas flowing into said NOx storage reduction catalyst to the same air fuel ratio as said target air fuel ratio in said air fuel ratio raising control; and
said controller further configured to carry out said temperature rise control by alternating air fuel ratios of all cylinders of said internal combustion engine between the rich air fuel ratio and the lean air fuel ratio.

2. The exhaust gas purification apparatus for an internal combustion engine as set forth in claim 1, further comprising:
wherein said controller further configured to estimate a storage amount of NOx in said NOx storage reduction catalyst; and
said controller further configured to make said target air fuel ratio in said air fuel ratio raising control higher, when the storage amount of NOx in said NOx storage reduction catalyst estimated by said controller is large, than when it is small.

3. The exhaust gas purification apparatus for an internal combustion engine as set forth in claim 1, further comprising:
an inflow ammonia amount estimator configured to estimate or detect an amount of ammonia flowing into said NOx selective catalytic reduction catalyst;
wherein said controller further configured to make said target air fuel ratio in said air fuel ratio raising control higher, when the amount of ammonia estimated or detected by said inflow ammonia amount estimator is large, than when it is small.

4. The exhaust gas purification apparatus for an internal combustion engine as set forth in claim 1, further comprising:
a release amount detector configured to estimate or detect an amount of NOx released per unit time from said NOx storage reduction catalyst; and
a three-way catalyst that is arranged in the exhaust passage at a location upstream of said NOx storage reduction catalyst;
wherein said internal combustion engine is provided with a plurality of cylinders; and
when the amount of NOx released per unit time from said NOx storage reduction catalyst estimated or detected by said release amount detector in a state where said target air fuel ratio is made high in the range of the rich air fuel ratio by means of said air fuel ratio raising control becomes less than a predetermined release amount, said controller further configured to carry out temperature rise control in which an air fuel ratio of the internal combustion engine is changed so that oxygen and unburnt fuel are contained in the exhaust gas flowing into said three-way catalyst, while controlling the air fuel ratio of the exhaust gas flowing into said NOx storage reduction catalyst to the same air fuel ratio as said target air fuel ratio in said air fuel ratio raising control.

5. The exhaust gas purification apparatus for an internal combustion engine as set forth in claim 1, wherein
when carrying out said temperature rise control, said controller further configured to make, in said temperature rise control, the air fuel ratio of a cylinder of the lean air fuel ratio to be higher and the air fuel ratio of a cylinder of the rich air fuel ratio to be lower, when the amount of NOx released per unit time from said NOx storage reduction catalyst estimated or detected by said release amount detector is small than when it is large, while controlling the air fuel ratio of the exhaust gas flowing into said NOx storage reduction catalyst to the same air fuel ratio as said target air fuel ratio in said air fuel ratio raising control.

6. The exhaust gas purification apparatus for an internal combustion engine as set forth in claim 1, wherein
said ammonia outflow detector is an NOx sensor that is arranged in the exhaust passage at a location downstream of said NOx selective catalytic reduction catalyst, for detecting an NOx concentration and an ammonia concentration in the exhaust gas; and
said controller further configured to carry out said air fuel ratio raising control, when ammonia is detected by said NOx sensor in the course of carrying out said rich spike control.

7. The exhaust gas purification apparatus for an internal combustion engine as set forth in claim 1, wherein
when the temperature of said NOx storage reduction catalyst is less than a predetermined temperature, and when the flow rate of the exhaust gas is less than a predetermined flow rate, and at the same time, when the amount of ammonia adsorbed in said NOx selective reduction catalyst is equal to or more than a predetermined amount of adsorption, said ammonia outflow detector further configured to estimate that ammonia will flow out from said NOx selective catalytic reduction catalyst when said rich spike control is carried out.

* * * * *